US010329975B2

(12) United States Patent
Fujii et al.

(10) Patent No.: US 10,329,975 B2
(45) Date of Patent: Jun. 25, 2019

(54) OIL SEPARATION DEVICE FOR INTERNAL COMBUSTION ENGINE

(71) Applicant: HONDA MOTOR CO., LTD., Tokyo (JP)

(72) Inventors: Takeshi Fujii, Wako (JP); Kazunari Shigemoto, Wako (JP); Mayuka Odo, Wako (JP); Yuya Kasajima, Wako (JP); Hirotaka Komatsu, Wako (JP); Junya Saito, Wako (JP); Kouji Nakano, Wako (JP); Sei Maruyama, Wako (JP); Yoshiki Matsushiro, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 61 days.

(21) Appl. No.: 15/657,755

(22) Filed: Jul. 24, 2017

(65) Prior Publication Data

US 2017/0321580 A1    Nov. 9, 2017

Related U.S. Application Data

(63) Continuation of application No. 15/033,943, filed as application No. PCT/JP2014/005604 on Nov. 7, 2014.

(30) Foreign Application Priority Data

Nov. 8, 2013   (JP) .................................. 2013-232596
Jul. 24, 2014   (JP) .................................. 2014-150489

(51) Int. Cl.
   *F01M 11/02*    (2006.01)
   *F01M 13/02*    (2006.01)
   (Continued)

(52) U.S. Cl.
   CPC .......... *F01M 13/04* (2013.01); *F01M 13/022* (2013.01); *F01M 13/0416* (2013.01);
   (Continued)

(58) Field of Classification Search
   CPC combination set(s) only.
   See application file for complete search history.

(56) References Cited

U.S. PATENT DOCUMENTS

| 31,276 A | 1/1861 | Winans |
| 2,970,669 A | 2/1961 | Bergson |
| (Continued) | | |

FOREIGN PATENT DOCUMENTS

| JP | S57022612 | 2/1982 |
| JP | S57028752 | 2/1982 |
| (Continued) | | |

OTHER PUBLICATIONS

Machine Translation of JP2003293725A PDF file name: "JP2003293725A_Machine_Translation.pdf".*

(Continued)

*Primary Examiner* — Grant Moubry
*Assistant Examiner* — Ruben Picon-Feliciano
(74) *Attorney, Agent, or Firm* — Armstrong Teasdale LLP

(57) ABSTRACT

To improve the oil separation performance in an oil separation device for an internal combustion engine. The oil separation device (10) comprises a gas liquid separation passage (56) internally defined by a lower wall, an upper wall and a pair of side walls, and extending in a horizontal direction, a gas inlet (54) and a gas outlet (63) provided on either end of the gas liquid separation passage, a plurality of lower partition walls (56H) projecting upward from the lower wall, and a plurality of upper partition walls (56J) projecting downward from the upper wall. The lower partition walls and the upper partition wall are tilted with respective the length wise direction in plan view so as to define a spiral passage. The lower wall is inclined with respect to a horizontal plane such that an upstream part of (Continued)

the lower wall is lower than a downstream part of the lower wall with respect to a direction of the swirl flow.

8 Claims, 20 Drawing Sheets

(51) Int. Cl.
    *F01M 13/04*     (2006.01)
    *F02M 25/06*     (2016.01)

(52) U.S. Cl.
    CPC ....... *F02M 25/06* (2013.01); *F01M 2011/023* (2013.01); *F01M 2013/0461* (2013.01); *Y02T 10/121* (2013.01)

(56) References Cited

U.S. PATENT DOCUMENTS

| | | | |
|---|---|---|---|
| 5,466,384 A | 11/1995 | Prevost et al. | |
| 7,942,122 B2 | 5/2011 | Shieh et al. | |
| 2007/0272176 A1 | 11/2007 | Wagner et al. | |
| 2008/0047505 A1 | 2/2008 | Lemke | |
| 2009/0301446 A1* | 12/2009 | Asanuma | F01M 13/028 |
| | | | 123/559.1 |
| 2012/0031276 A1 | 2/2012 | Meusel et al. | |
| 2013/0074815 A1* | 3/2013 | Yuge | F01M 13/023 |
| | | | 123/574 |
| 2013/0312720 A1 | 11/2013 | Aquino | |

FOREIGN PATENT DOCUMENTS

| | | |
|---|---|---|
| JP | 57123909 | 8/1982 |
| JP | S59518 U | 1/1984 |
| JP | 5954705 U | 4/1984 |
| JP | 60145214 U | 9/1985 |
| JP | S60192821 A | 10/1985 |
| JP | S6251774 A | 3/1987 |
| JP | H01141317 U | 9/1989 |
| JP | H0323304 A | 1/1991 |
| JP | H07247820 A | 9/1995 |
| JP | H10118476 A | 5/1998 |
| JP | H1114833 A | 6/1999 |
| JP | 2000008828 A | 1/2000 |
| JP | 2000354749 A | 12/2000 |
| JP | 2003254031 A | 9/2003 |
| JP | 2003293725 A * | 10/2003 |
| JP | 2004521237 A | 7/2004 |
| JP | 2004360474 A | 12/2004 |
| JP | 2005337123 A | 12/2005 |
| JP | 2007255235 A | 10/2007 |
| JP | 2007527789 A | 10/2007 |
| JP | 2007332874 A | 12/2007 |
| JP | 2008121478 A | 5/2008 |
| JP | 2008215214 A | 9/2008 |
| JP | 2009522486 A | 6/2009 |
| JP | 2010090802 A | 4/2010 |
| JP | 2010216315 A | 9/2010 |
| JP | 2012012951 A | 1/2012 |
| JP | 2012067728 A | 4/2012 |
| JP | 2012149528 A | 8/2012 |
| JP | 2013096229 A | 5/2013 |
| JP | 2013113109 A | 6/2013 |
| JP | 2013155691 A | 8/2013 |
| JP | 2013217262 A | 10/2013 |
| WO | 2014103443 A1 | 7/2014 |

OTHER PUBLICATIONS

Office Action of Japanese Application No. 2013-232596, 6 pages.
Written Opinion of the International Searching Authority of International Application No. PCT/JP2014/005604 with English Translation, dated Feb. 17, 2015, 13 pages.
Decision to Grant a Patent for Japanese Application No. 2014-150489, dated May 29, 2017, 3 pages.
Decision to Grant a Patent for Japanese Application No. 2013-232596, dated Jul. 28, 2016, 3 pages.
Office Action for Japanese Patent Application No. 2014-150489, dated Nov. 22, 2016, 12 pages.
Office Action of Japanese Application No. 2014-150489, dated May 10, 2016, 7 pages.

* cited by examiner

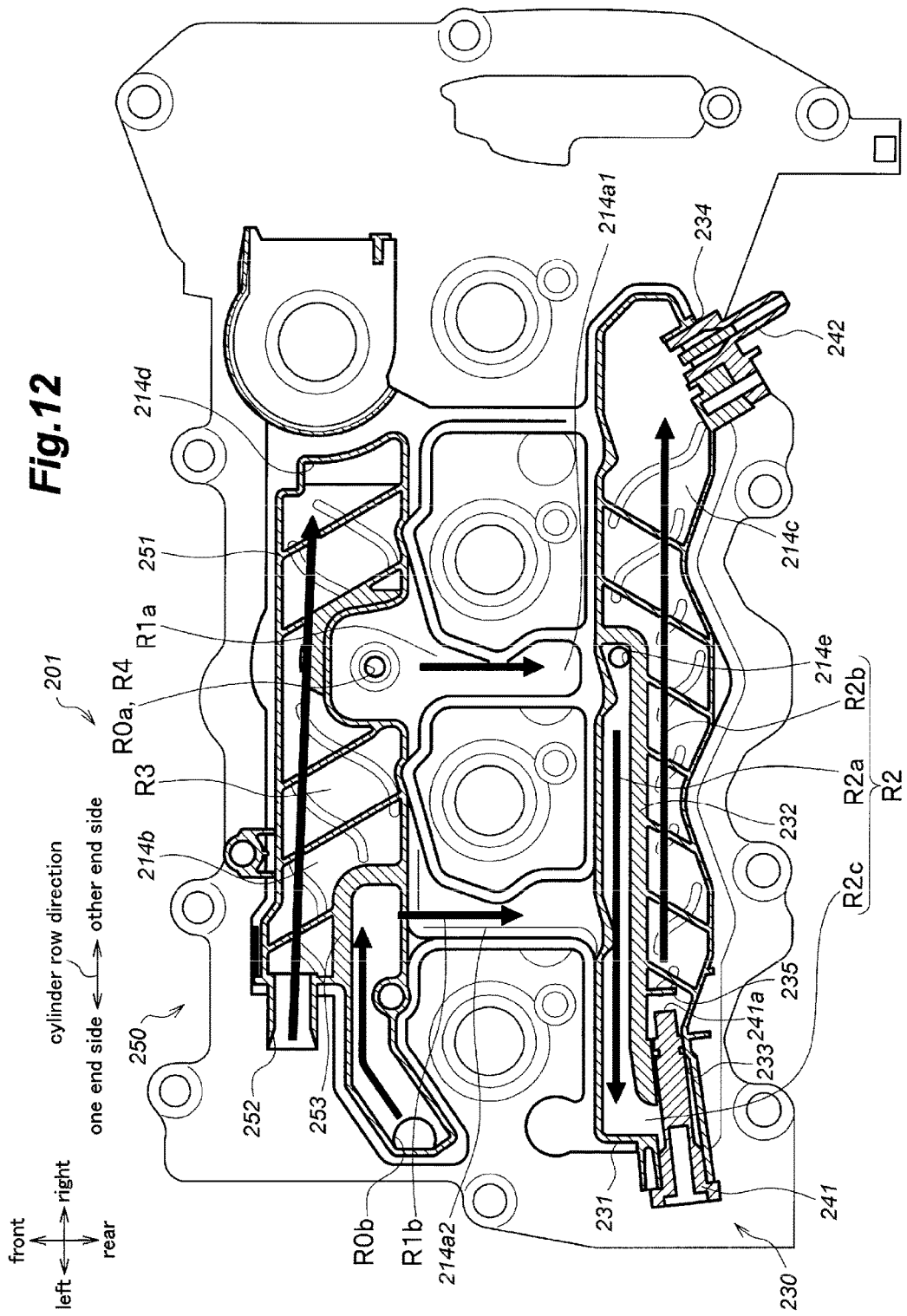

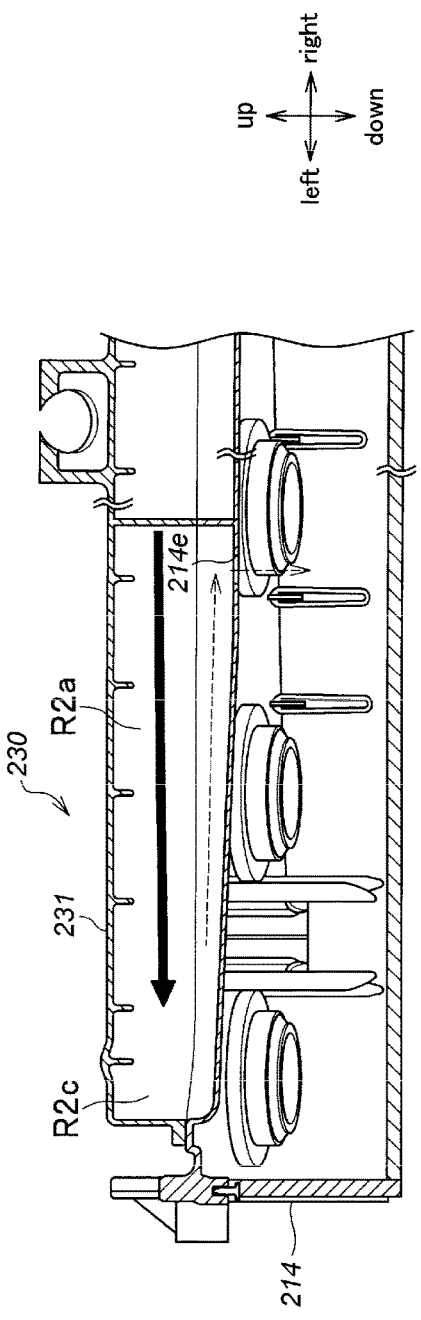
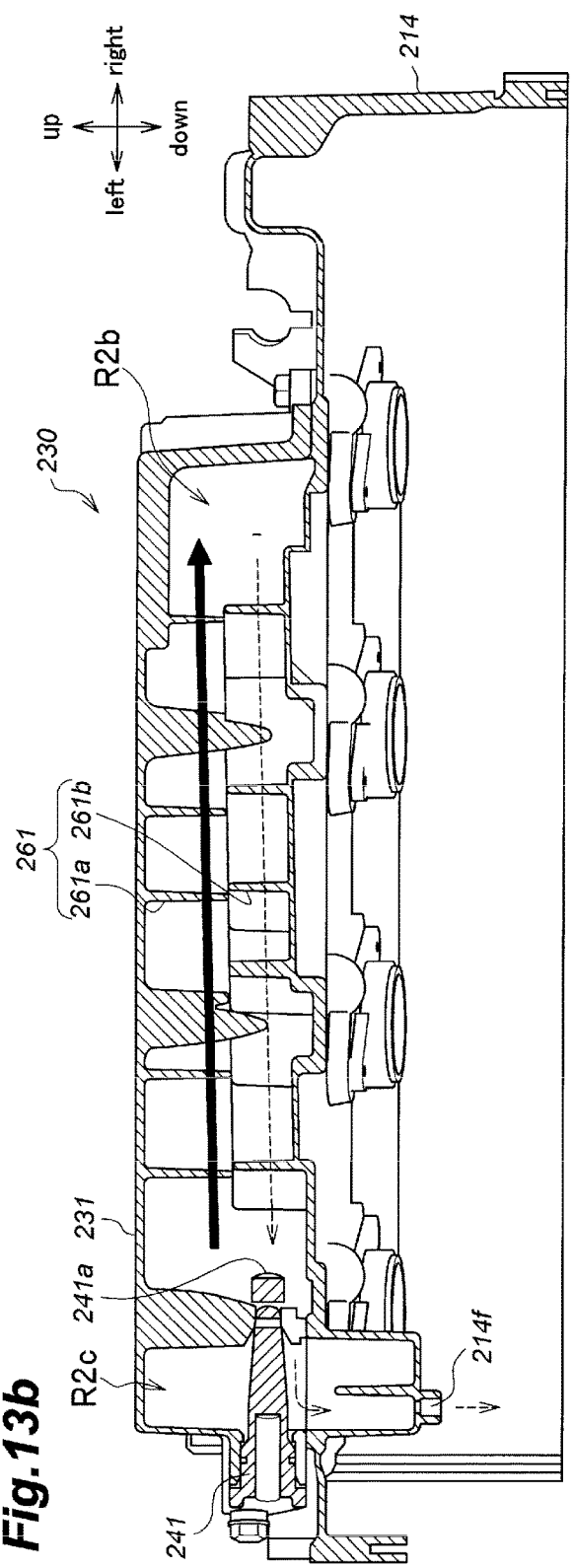
Fig.13a
Fig.13b

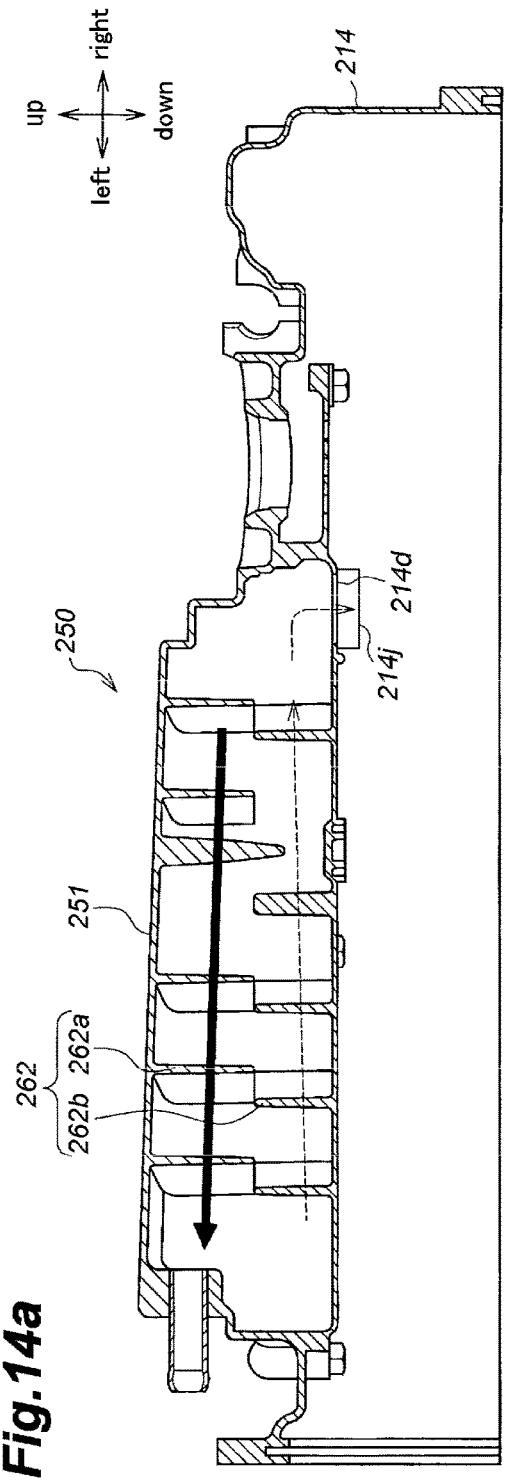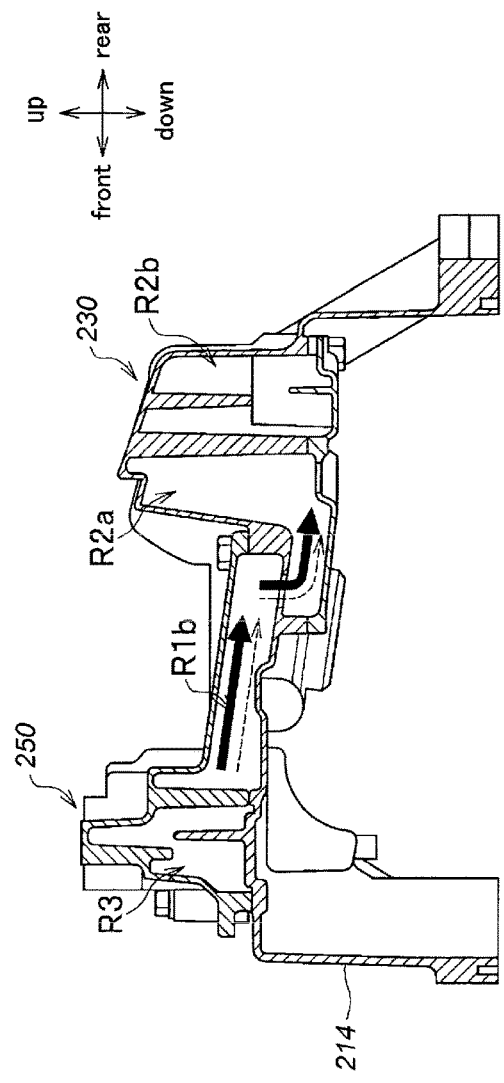
Fig.14a
Fig.14b

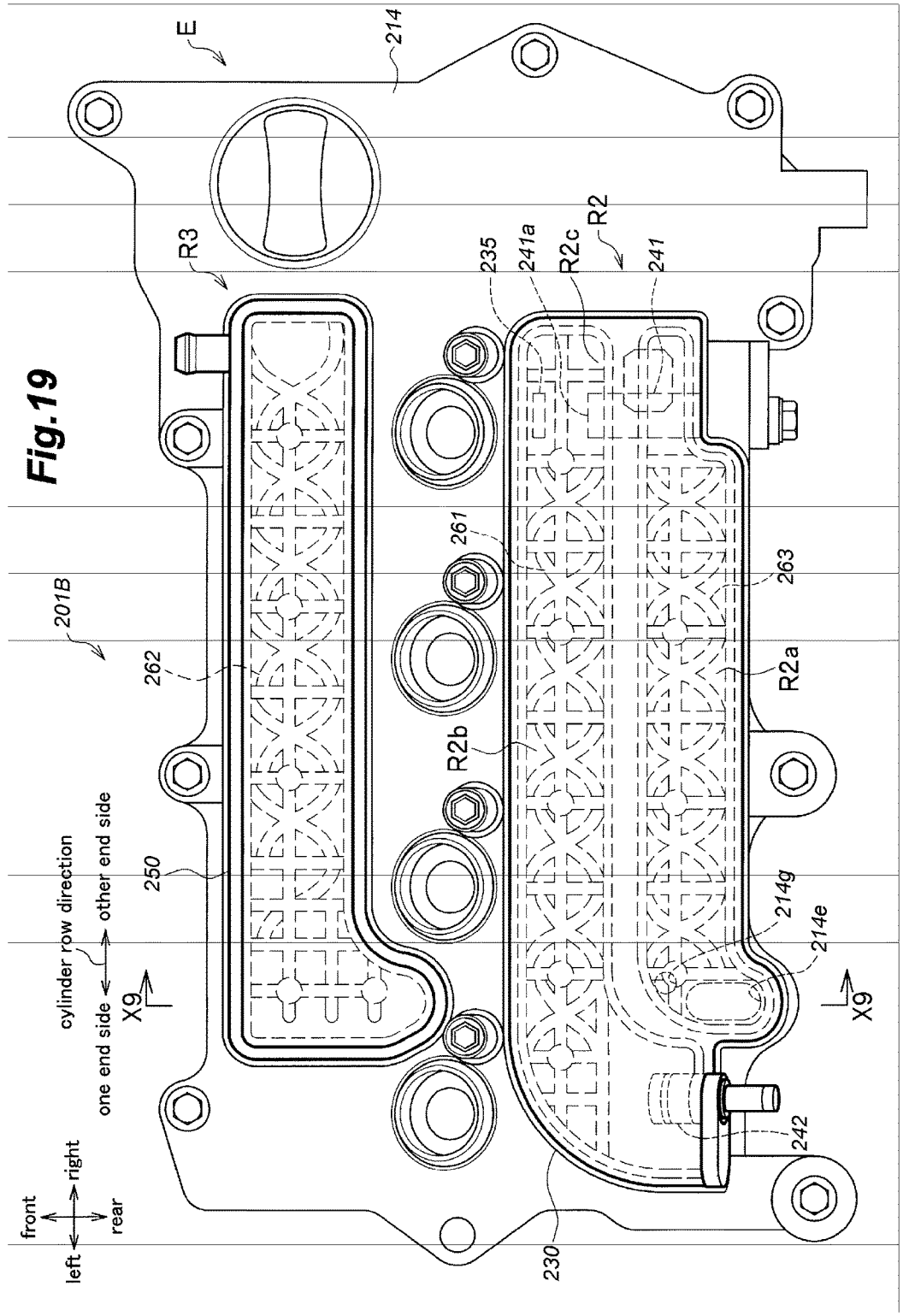

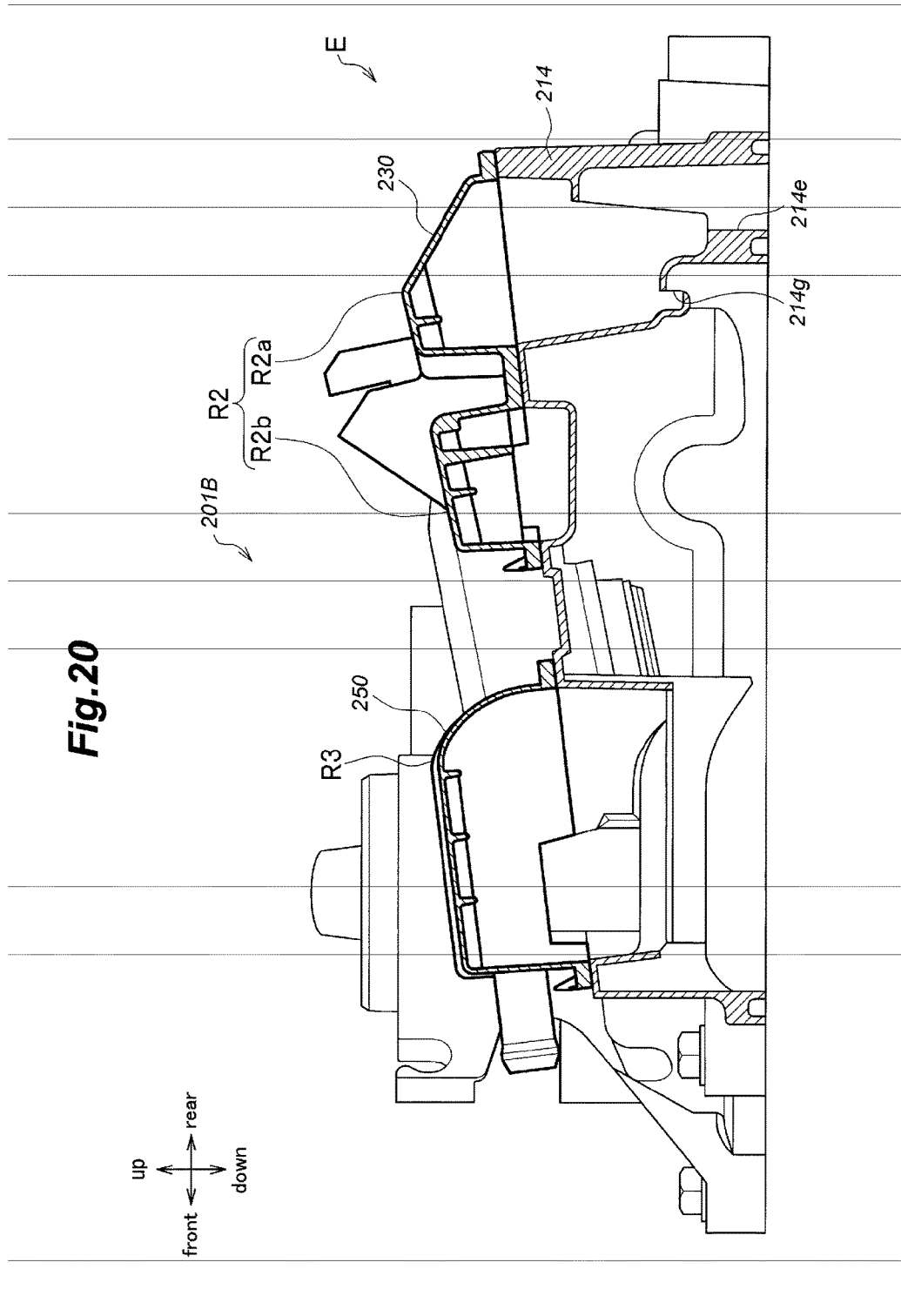

OIL SEPARATION DEVICE FOR INTERNAL COMBUSTION ENGINE

CROSS REFERENCE TO RELATED APPLICATIONS

This application is a continuation application of U.S. patent application Ser. No. 15/033,943 entitled OIL SEPARATION DEVICE FOR INTERNAL COMBUSTION ENGINE, filed May 3, 2016, the disclosure of which is fully incorporated herein by reference. U.S. patent application Ser. No. 15/033,943 is a National Stage Entry of PCT Application Serial No. PCT/JP2014/005604 filed Nov. 7, 2014. PCT Application Serial No. PCT/JP/2014/005604 claims benefit to Japanese Patent Application No. 2014-150489 filed Jul. 24, 2014 and Japanese Patent Application No. 2013-232596 filed Nov. 8, 2013.

TECHNICAL FIELD

The present invention relates to an oil separation device (breather system) for an internal combustion engine, and in particular to an oil separation device for separating oil mist from blow-by gas.

BACKGROUND ART

In the field of internal combustion engines, it is known to provide an oil separation device in a blow-by passage for returning the blow-by gas in a crankcase chamber back to an intake system. For instance, in the arrangements disclosed in Patent Documents 1 and 2, a head cover formed by combining a plurality of members is internally provided with a gas liquid separation chamber in which a plurality of baffle plates are positioned. The blow-by gas containing oil mist changes the flow direction thereof by colliding with the baffle plates as the blow-by gas travels from the inlet to the outlet of the gas liquid separation chamber. When the blow-by gas changes the flow direction thereof, the oil contained in the blow-by gas is caused to adhere to the baffle plates owing to the inertia thereof, and is thereby removed from the blow-by gas.

PRIOR ART DOCUMENT(S)

Patent Document(s)

Patent Document 1 JP4043825B
Patent Document 2 JP4353473B

SUMMARY OF THE INVENTION

Task to be Accomplished by the Invention

In an oil separation device configured to remove oil by means of a plurality of baffle plates, oil separation performance can be improved by increasing the number of baffle plates, increasing the degree of tortuousness of the passage for the blow-by gas and/or increasing the length of the passage for the blow-by gas. However, these approaches increase the flow resistance at the same time, and the resulting reduction in the velocity of the blow-by gas flow imposes a limit on the improvement in oil separation performance.

The present invention was made in view of such a problem of the prior art, and has a primary object to provide an oil separation device for an internal combustion engine with an improved oil separation performance.

Means for Accomplish the Task

To achieve such an object, the present invention provides an oil separation device (10) for an internal combustion engine (1), comprising: a gas liquid separation passage (56) internally defined by a passage forming member (41, 42) including a lower wall (56A), an upper wall (56B) and a pair of side walls (56C, 56D), and extending in a horizontal direction; a gas inlet (54) provided on one end of the gas liquid separation passage and a gas outlet (63) provided on another end of the gas liquid separation passage; a plurality of lower partition walls (56H) projecting upward from the lower wall and disposed in parallel to one another; and a plurality of upper partition walls (56J) projecting downward from the upper wall and disposed in parallel to one another; wherein each lower partition wall extends in a first direction which is tilted with respect to a lengthwise direction of the gas liquid separation passage in plan view, and each upper partition wall extends in a second direction crossing the first direction so that a spiral passage extending in the lengthwise direction of the gas liquid separation passage is defined by the lower partition walls and the upper partition walls; and wherein the spiral passage with a certain turn is defined by the lower partition walls and the upper partition walls for causing a swirl flow as gas flows from the gas inlet to the gas outlet, and the lower wall is inclined with respect to a horizontal plane such that an upstream part of the lower wall is lower than a downstream part of the lower wall when viewed in a direction of the swirl flow.

According to this arrangement, a spiral passage is defined in the gas liquid separation chamber, and the blow-by gas flowing through the spiral passage is converted into a vortex flow. Thereby, the oil contained in the gas is adhered to the lower wall, the upper wall and the side walls by the centrifugal force, and is separated from the gas. Because the upper partition walls and the lower partition walls form a spiral passage for conducting the gas along a spiral path so that the flow resistance can be minimized as opposed to the labyrinth passage, and reduction in the flow velocity of the gas can be minimized. Because the lower wall is inclined so that the bottom surfaces opposes the swirl flow created in the gas flowing from the gas inlet to the gas outlet, the adherence of the oil in the gas is promoted, and the oil separation performance can be improved.

In this invention, one of the side walls (56C) located on the upstream part may define an acute angle with respect to the lower wall.

Thereby, the gas flowing along the spiral passage is bent at an acute angle at the boundary between the one side wall and the bottom wall as the gas flows along the one side wall and the bottom wall.

In this invention, it may be arranged such that the other side wall (56D) located on a downstream side extends in parallel with the one side wall, and the upper wall extends in parallel with the lower wall so that the air gas separation passage is provided with a parallelepiped cross section extending perpendicular to the lengthwise direction.

Thereby, the gas flowing along the spiral passage is bent at an acute angle at the boundary between the other side wall and the upper wall as the gas flows along the other side wall and the upper wall. Thereby, the adherence of the oil to the upper wall is promoted. The oil that has deposited on the upper wall flows down to the upstream side of the lower wall along the upper wall and the side wall, or directly dropping onto the lower wall.

In this invention, each lower partition wall may define a gap with respect to the one side wall (56C) on an upstream side.

According to this arrangement, the oil that has been collected on the upstream side of the lower wall can move in the lengthwise direction of the gas liquid separation passage by passing through the gaps defined between the one side wall and the lower partition walls.

In this invention, preferably, a lower end surface of each upper partition wall is located higher than an upper end surface of each lower partition wall, and each upper partition wall crosses at least one of the lower partition walls in plan view.

According to this arrangement, because the upper partition walls and the lower partition walls do not interfere with one another so that relatively large numbers of upper partition walls and lower partition walls can be arranged in the gas liquid separation chamber. By increasing the numbers of the upper partition walls and lower partition walls, the number of turns of the swirl flow for a given length of the spiral passage can be increased. By thus increasing the number of turns of the swirl flow traveling from the gas inlet to the gas outlet, the oil separation performance can be improved.

In this invention, preferably, a lower end surface of each upper partition wall includes a part that contacts the upper end surface of the corresponding lower partition wall.

According to this arrangement, because the lower end surfaces of the upper partition walls and the upper end surfaces of the lower partition walls abut one another, the spiral passage is better defined so that the blow-by gas flowing through the gas liquid separation passage can be converted into a vortex flow in an even more reliable manner.

In this invention, the gas liquid separation passage may include a narrowed section at least in a part thereof, the narrowed section (56G) having a reduced cross section in comparison to adjoining part.

Thereby, the flow velocity of the blow-by gas is increased at the narrowed section so that the oil can be separated even more favorably by the centrifugal force.

In this invention, preferably, the passage forming member includes a first cover member (41) and a second cover member (42) jointly forming a part of a head cover of the internal combustion engine, and the first cover member includes at least the lower wall and the lower partition walls while the second cover member includes at least the upper wall and the upper partition walls.

According to this arrangement, the gas liquid separation passage having the upper partition walls and the lower partition walls can be formed with a highly simple structure.

Another aspect of the present invention provides a breather system (oil separation device: 201) of an internal combustion engine (E) provided with a PCV circuit for returning blow-by gas produced in an internal combustion engine fitted with a supercharger to an intake passage (202x) by using an intake negative pressure produced in the intake passage to be used for combustion once again, the breather system comprising, a breather chamber (R3) provided on top of a head cover (214) of the internal combustion engine and communicating with a breather passage (R0a, R0b) for conducting blow-by gas produced in the internal combustion chamber, the breather chamber including a first gas liquid separation chamber (R2a) extending in a cylinder row direction and communicating with the breather passage, a second gas liquid separation chamber (R2b) extending in the cylinder row direction along the first gas liquid separation chamber and communicating with an interior of the internal combustion engine via the intake passage, and a communication passage (R2c) communicating the first gas liquid separation chamber with the second gas liquid separation chamber at one end of the internal combustion engine with respect to the cylinder row direction; a PCV valve (241) provided in the communication passage for adjusting a flow rate of the blow-by gas; and a one-way valve (242) provided at another end of the internal combustion engine with respect to the cylinder row direction for expelling the blow-by gas from the second gas liquid separation chamber; wherein the second gas liquid separation chamber includes a spiral passage (261) for causing a swirling flow of the blow-by gas in the second gas liquid separation chamber.

According to this arrangement, because the PCV valve separates the breather chamber into two gas liquid separation chambers, the part of the oil mist in the form of relatively large particles is captured by the PCV valve, and removed therefrom as the blow-by gas flows through the PCV valve. The part of the oil mist in the form of relatively small particles is converted into oil mist in the form of relatively large particles as the blow-by gas flows through narrow passage of the PCV valve by adhering to one another before being introduced into the second gas liquid separation chamber. The oil mist in the form of relatively large particles can be readily separated from the blow-by gas in the second gas liquid separation chamber. Because the blow-by gas flows through the second gas liquid separation chamber as a swirl flow including a vertical motion owing to the spiral passage defined in the second gas liquid separation chamber, the small particles of oil contained in the blow-by gas are caused to adhere to one another and converted into large particles of oil under the centrifugal force created by the swirl flow so that the gas liquid separation performance can be improved. Because the blow-by gas outlet of the second gas liquid separation chamber is provided with the one way valve, when the intake passage is placed under a positive pressure condition owing to the operation of the supercharger, the reverse flow of fresh air from the intake passage to the breather chamber can be avoided so that the adjustment of the pressure in the interior of the internal combustion engine can be performed favorably, and the scavenging performance of the internal combustion engine can be improved.

According to a preferred embodiment of the present invention, in the breather system of an internal combustion engine, a fresh air chamber (R3) extends in the cylinder row direction along the breather chamber in an upper part of the head cover of the internal combustion engine for introducing fresh air into an interior of the internal combustion engine and scavenging an interior of the internal combustion engine by using an intake negative pressure in the internal combustion engine, and the fresh air chamber communicates with an interior of the internal combustion engine at one end thereof with respect to the cylinder row direction and with a part of the intake passage on an upstream side of the supercharger at another end thereof with respect to the cylinder row direction, and is provided with a spiral passage (262) for causing a swirl flow of the fresh air and the blow-by gas conducted in the fresh air chamber.

According to this arrangement, when the blow-by gas in the internal combustion engine is supplied to the intake passage by the intake negative pressure, the negative pressure in the interior of the internal combustion engine causes fresh air to be introduced from the fresh air chamber to the interior of the internal combustion engine so that the interior of the internal combustion engine can be favorably scavenged. When the supercharger is in operation or when the engine is operated under a high load and a high rpm condition, the intake passage is placed under positive pressure condition by the compressor of the supercharger. The one way valve in the breather chamber closes at such a time so that the blow-by gas ceases to flow in the breather chamber, and there is a fear that the blow-by gas might flow into the fresh air chamber. However, the fresh air chamber including the spiral passage functions as a gas liquid separation chamber, and a favorable gas liquid separation function is performed so that the blow-by gas free from oil is introduced into the intake passage. Therefore, deposition of oil in the intake passage can be prevented, and the pressure in the internal combustion engine can be favorably controlled so that the scavenging performance for the interior of the internal combustion engine can be favorably maintained.

Preferably, the spiral passage comprises a lower rib (261b, 262b) extending upward from a bottom surface of the corresponding chamber provided with the spiral passage and an upper rib (261a, 262a) extending downward from a ceiling surface of the corresponding chamber, the lower rib and the upper rib crossing each other so as to present a letter X shape in plan view.

According to this arrangement, because the ribs of the spiral passage cause the blow-by gas to form a swirl flow including the motion in the vertical direction, even when the length of the internal combustion engine in the cylinder row direction is short, and the cross sectional area of each chamber is small, an adequate gas liquid separation performance can be achieved.

According to another embodiment of the present invention, the breather system of the internal combustion engine further comprises a guide passage (R1a) provided in the head cover of the internal combustion engine for communicating the breather chamber with a breather passage for conducting blow-by gas produced in the internal combustion engine, the guide passage communicating with the first gas liquid separation chamber at an end part of the first gas liquid separation chamber on the other end side of the cylinder row direction; a first oil return portion (214e) formed in a part of a bottom wall of the first gas liquid separation chamber on the other end side of the cylinder row direction; and a second oil return portion (214f) formed in a part of a bottom wall of the second gas liquid separation chamber on the one end side of the cylinder row direction or in a part of a bottom wall of the communication passage adjacent to the second gas liquid separation chamber.

According to this arrangement, when the supercharger is in operation and the intake passage is under a positive pressure condition, the one way valve provided in the breather chamber is closed so that the flow of the blow-by gas essentially ceases. Even at such a time, the oil separated from the blow-by gas in the guide passage and the first gas liquid separation passage can be quickly returned to the interior of the internal combustion engine via the first oil return hole. The oil collected in the second gas liquid separation passage can be quickly returned to the interior of the engine via the second oil return hole. When the engine is operated at a low or medium rotational speed, and the supercharger is not in operation, the intake passage is placed under negative pressure condition. At such a time, because the flow velocity of the blow-by gas flowing into the first gas liquid separation passage is relatively low, even though the first oil return hole is provided adjacent to the guide passage, the separated oil located adjacent to the first oil return hole is not blown up by the blow-gas so that very little of the separated oil is mixed into the blow-by gas. Because the first oil return hole is provided remote from the PCV valve, the oil in the first gas liquid separation chamber is prevented from stagnating in an area adjoining the PCV valve, and is prevented from obstructing the flow of the blow-by gas in the PCV valve.

According to another embodiment of the present invention, the first gas liquid separation chamber comprises a hole portion serving as an oil return hole and a blow-by gas inlet hole formed in a bottom wall of an end of the first gas liquid separation chamber on the other end side of the cylinder row direction, and an auxiliary opening (21ag) for introducing the blow-by gas into the first gas liquid separation chamber, the auxiliary opening being provided in a part of the first gas liquid separation chamber located higher than the hole portion serving as an oil return hole and a blow-by gas inlet hole in a state where the internal combustion engine is mounted on a vehicle and different from an upstream side of a downward flow of oil separated from the blow-by gas.

According to this arrangement, even when the oil return hole portion is blocked by the returned oil, the blow-by gas can be introduced into the breather chamber via the auxiliary opening located near the oil return hole portion in a favorable manner.

Preferably, a bottom surface of the first gas liquid separation chamber is inclined downward from one end side of the cylinder row direction to another end side of the cylinder row direction in a state where the internal combustion engine is mounted on a vehicle; and wherein a bottom surface of the second gas liquid separation chamber is inclined downward from the other end side of the cylinder row direction to the one end side of the cylinder row direction in a state where the internal combustion engine is mounted on a vehicle.

According to this arrangement, because the bottom surfaces of the first gas liquid separation chamber and the second gas liquid separation chamber are inclined downward toward the respective oil return hole portions, the oil separated from the blow-by gas in the first and second gas liquid separation chambers can be quickly returned to the interior of the internal combustion engine via the respective oil return hole portions.

Preferably, the PCV valve is provided along a length of the second gas liquid separation chamber in a part of the communication passage adjacent to a side wall of the second gas liquid separation chamber, and the second gas liquid separation chamber is provided with a rib (235) opposing a blow-by gas outlet of the PCV valve and spaced from the blow-by gas outlet by a prescribed gap.

According to this arrangement, because the PCV valve serving also as a communication passage between the first and second gas liquid separation passages extends along the length of the second gas liquid separation passage, the width of the head cover with respect to the direction perpendicular to the cylinder row direction can be minimized, and a compact design of the breather chamber and a high gas liquid separation performance can be achieved at the same time. The blow-by gas that has been expelled from the blow-by gas outlet of the PCV valve to the second gas liquid separation passage acquires an increased velocity by passing through a narrow passage of the PCV valve, and collides with the rib provided opposite to the blow-by gas outlet of the PCV valve with the result that the fine oil particles of the oil mist are deposited on the rib, and flows downward as droplets of larger sizes.

In the breather system for an internal combustion engine according to the present invention, preferably, the breather passage and the guide passage include a plurality of breather passages and a plurality of communication passages, and the breather passages are formed in parts of a bottom of the oil pan of the internal combustion engine having mutually different depths.

Because the breather passages are provided in the parts of the oil pan having different depths, even when the internal combustion engine E is inclined owing to the cornering of the vehicle or the inclination of the road surface, and part of the breather passages are submerged in the oil, the blow-by gas can still be introduced into the breather chamber via the remaining breather passages so that the pressure in the internal combustion engine E can be favorably adjusted, and an increase in friction owing to the increase in the blow-by gas in the crankcase chamber can be avoided.

According to a preferred embodiment of the present invention, the breather passage functions as an oil level gauge insertion hole, and the upper end of the breather passage communicates with the guide passage by branching out from the oil level gauge insertion hole, and the head cover includes an oil level gauge guide hole (214h) opposing a front end of the oil level gauge insertion hole and a guard member covering a part located between the oil level gauge guide hole and the oil level gauge insertion hole.

According to this arrangement, because a same, single hole serves as both the breather passage and the oil level gauge insertion hole, the manufacturing work is simplified, and the size of the internal combustion engine can be reduced. Also, owing to the presence of the guard members, the smearing of the upper end of the oil level gauge insertion hole with the oil mist in the blow-by gas flowing through the breather passage can be avoided, and the oil dropping from the oil return hole is prevented from splashing onto the upper end of the oil level gauge insertion hole. In other words, when the oil level gauge is inserted into the oil level gauge insertion hole or is removed from the oil level gauge insertion hole, oil is prevented from being deposited on the gauge part of the oil level gauge in the upper end of the oil level gauge insertion hole so that the oil level can be favorably measured without suffering from such interferences.

The oil level gauge may further comprise a bulging part (272) for closing a part of the oil level gauge insertion hole located above a part thereof where the breather passage branches out.

According to this arrangement, even when oil should be deposited on the upper end of the oil level gauge insertion hole, the oil is deposited on the bulging part, and is thereby prevented from being deposited on the gauge part of the oil level gauge so that the oil level can be favorably measured at all times.

Effect of the Invention

The oil separation device for an internal combustion engine arranged as discussed above can improve oil separation performance.

BRIEF DESCRIPTION OF THE DRAWING(S)

FIG. 12 is a sectional view of the head cover incorporated with the breather chamber and the fresh air chamber, showing the flow of blow-by gas under a negative pressure condition;

FIG. 13a is a view as seen in the direction of arrow X1 in FIG. 11;

FIG. 13b is a view as seen in the direction of arrow X2 in FIG. 11;

FIG. 14a is a view as seen in the direction of arrow X3 in FIG. 11;

FIG. 14b is a view as seen in the direction of arrow X4 in FIG. 11;

FIG. 19 is a plan view of a breather system given as another embodiment of the present invention; and FIG. 20 is a view as seen in the direction of arrow X9 in FIG. 19.

DESCRIPTION OF THE PREFERRED EMBODIMENT(S)

Preferred embodiments of the present invention as applied to automotive internal combustion engines are described in the following with reference to the appended drawings.

First Embodiment

Figure 1:
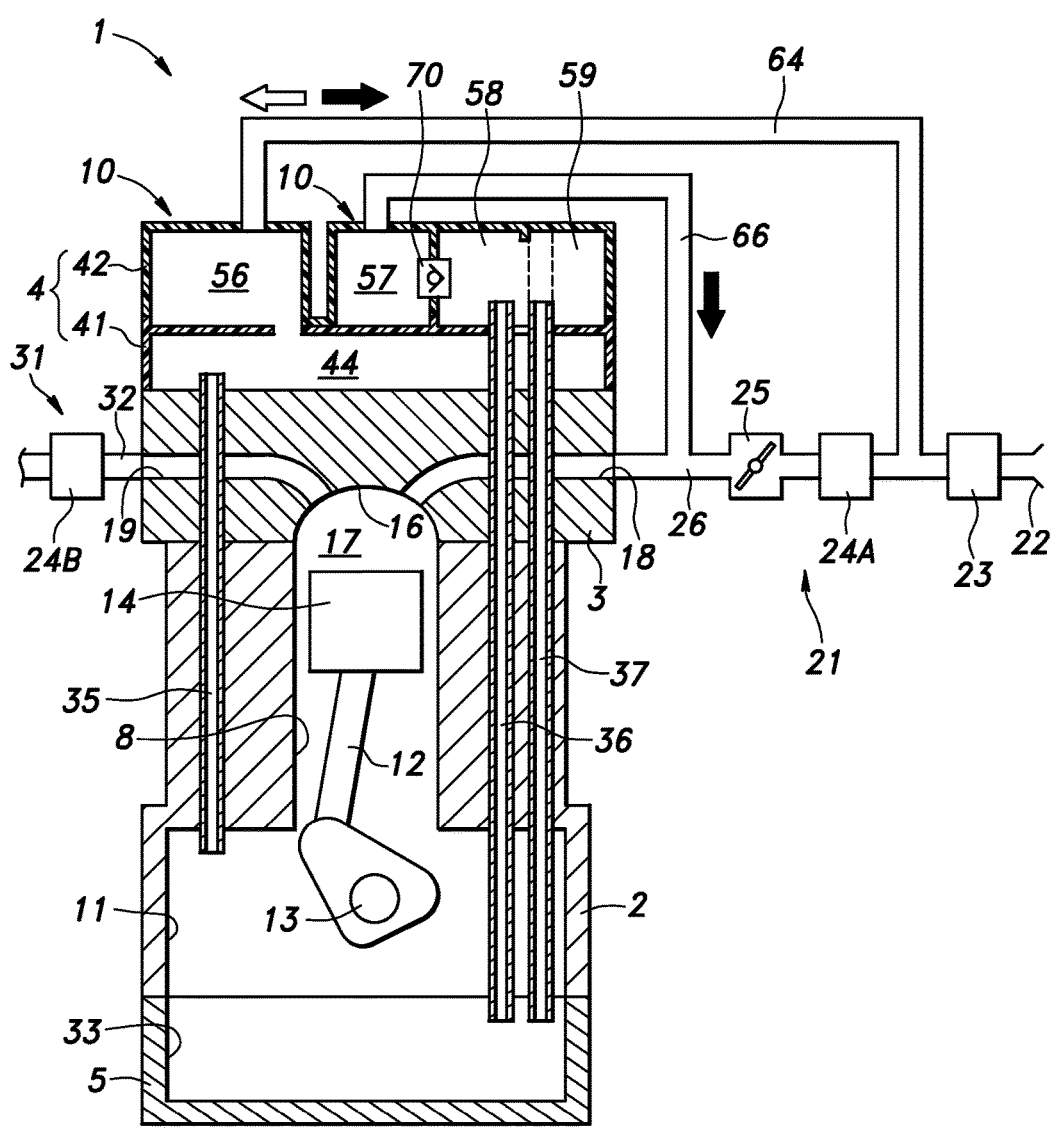
FIG. 1 is a diagram of an internal combustion engine fitted with an oil separation device given as a first embodiment of the present invention.

The internal combustion engine of the first embodiment consists of an in line, four-cylinder reciprocating engine. As shown in FIG. 1, the engine 1 includes a cylinder block 2, a cylinder head 3 attached to the upper part of the cylinder block 2, a head cover 4 attached to an upper part of the cylinder head 3 and an oil pan 5 attached to a lower part of the cylinder block 2. The head cover 4 is provided with a pair of oil separation devices 10 for removing oil from gas circulating therein.

The cylinder block 2 defines four cylinders 8 provided with axial center lines which are mutually parallel to one another and disposed in series on a common hypothetical plane. The direction along which the cylinders are disposed are called as a cylinder row direction, and the direction perpendicular to both the cylinder row direction and the lateral direction is called as a fore and aft direction. The cylinders 8 are referred to as the first, second, third and fourth cylinders from the left most one to the right most one in FIG. 2.

Each cylinder 8 opens out at the upper surface of the cylinder block 2 at the upper end thereof, and communicates with a crankcase chamber 11 defined in a lower part of the cylinder block 2 at the lower end thereof. Each cylinder 8 receives a piston 14 in a slidable manner, and the piston 14 is connected to a crankshaft 13 via a connecting rod 12. The axial line of the crankshaft 13 extends in the lateral direction in FIG. 2.

The cylinder head 3 is elongated in the cylinder row direction (in the lateral direction in FIG. 2), and is provided on the lower surface thereof with four combustion chamber recesses 16 corresponding to the respective cylinders 8. The cylinder head 3 is also provided with intake ports 18 extending from the respective combustion chamber recesses 16 to the rear side of the cylinder head 3, and exhaust ports 19 extending from the respective combustion chamber recesses 16 to the front side of the cylinder head 3.

The intake system 21 of the internal combustion engine 1 includes an air inlet 22, an air cleaner 23, a compressor 24A of a turbocharger, a throttle valve 25 and an intake manifold 26 in that order from the upstream end. The exhaust system 31 of the internal combustion engine 1 includes an exhaust manifold 32, a turbine 24B of the turbocharger, a catalytic converter (not shown in the drawings), a muffler (not shown in the drawings) and an exhaust outlet (not shown in the drawings) in that order from the upstream end. The exhaust manifold 32 is connected to the cylinder head 3, and communicate with the exhaust ports 19.

The oil pan 5 consists of a box having an open upper end, and is connected to the lower part of the cylinder block 2 to define an oil chamber 33 for storing engine oil.

The cylinder block 2 and the cylinder head 3 extend vertically, and define an oil return passage 35, a first blow-by gas passage 36 and a gauge passage 37, each having a lower end opening out to the crankcase chamber 11 and an upper end opening out at the upper surface of the cylinder head 3. The oil return passage 35 is configured to return the oil that is collected on the upper surface of the cylinder head 3 to the crankcase chamber 11 and the oil chamber 33. The gauge passage 37 is a passage for receiving an oil level gauge 51. The first blow-by gas passage 36 extends in a front left part of the first cylinder 8. The gauge passage 37 is located laterally between the second cylinder 8 and the third cylinder 8 in a forwardly offset manner.

Figure 2:
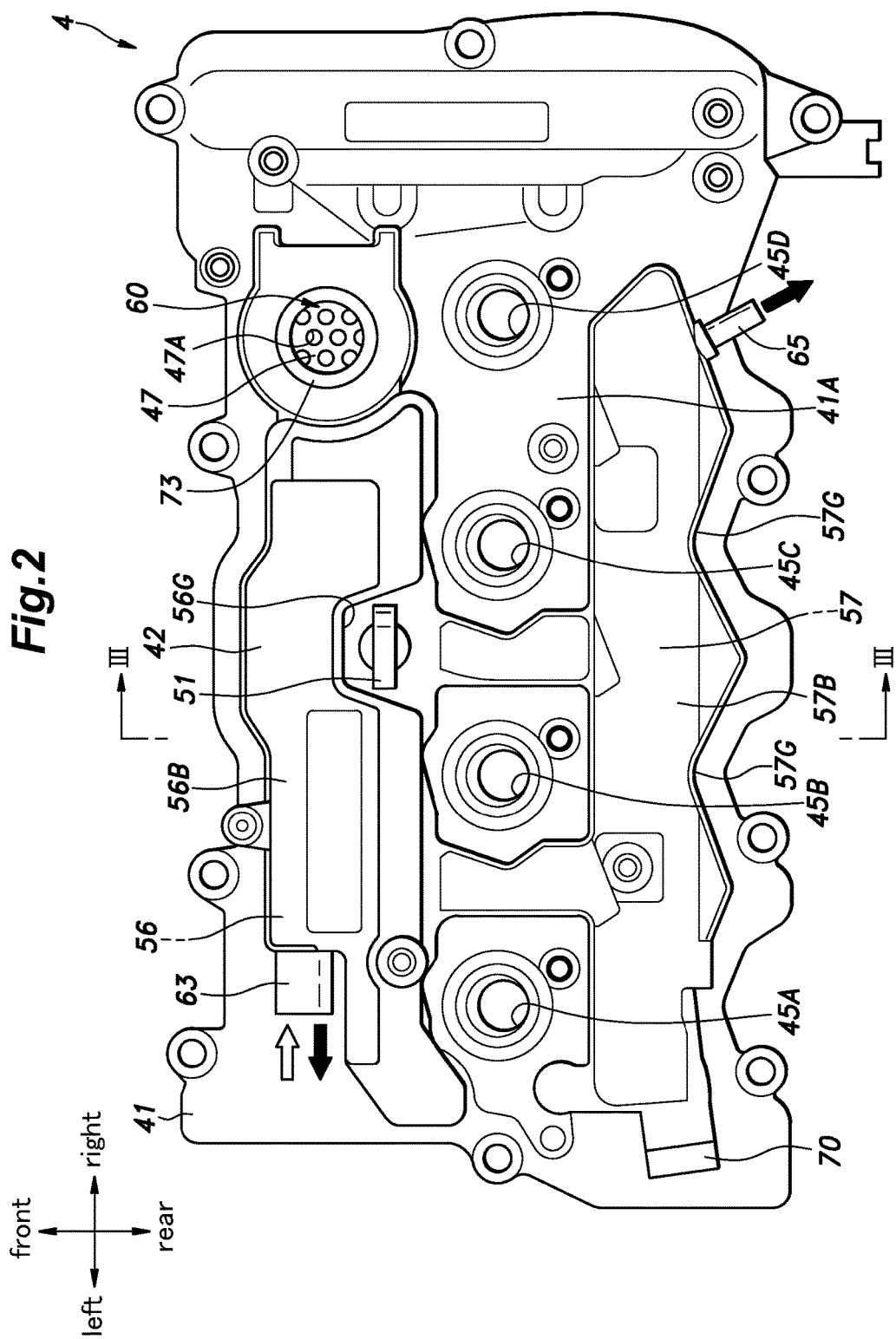
FIG. 2 is a plan view of a head cover incorporated with the oil separation device of the first embodiment.
Figure 3:
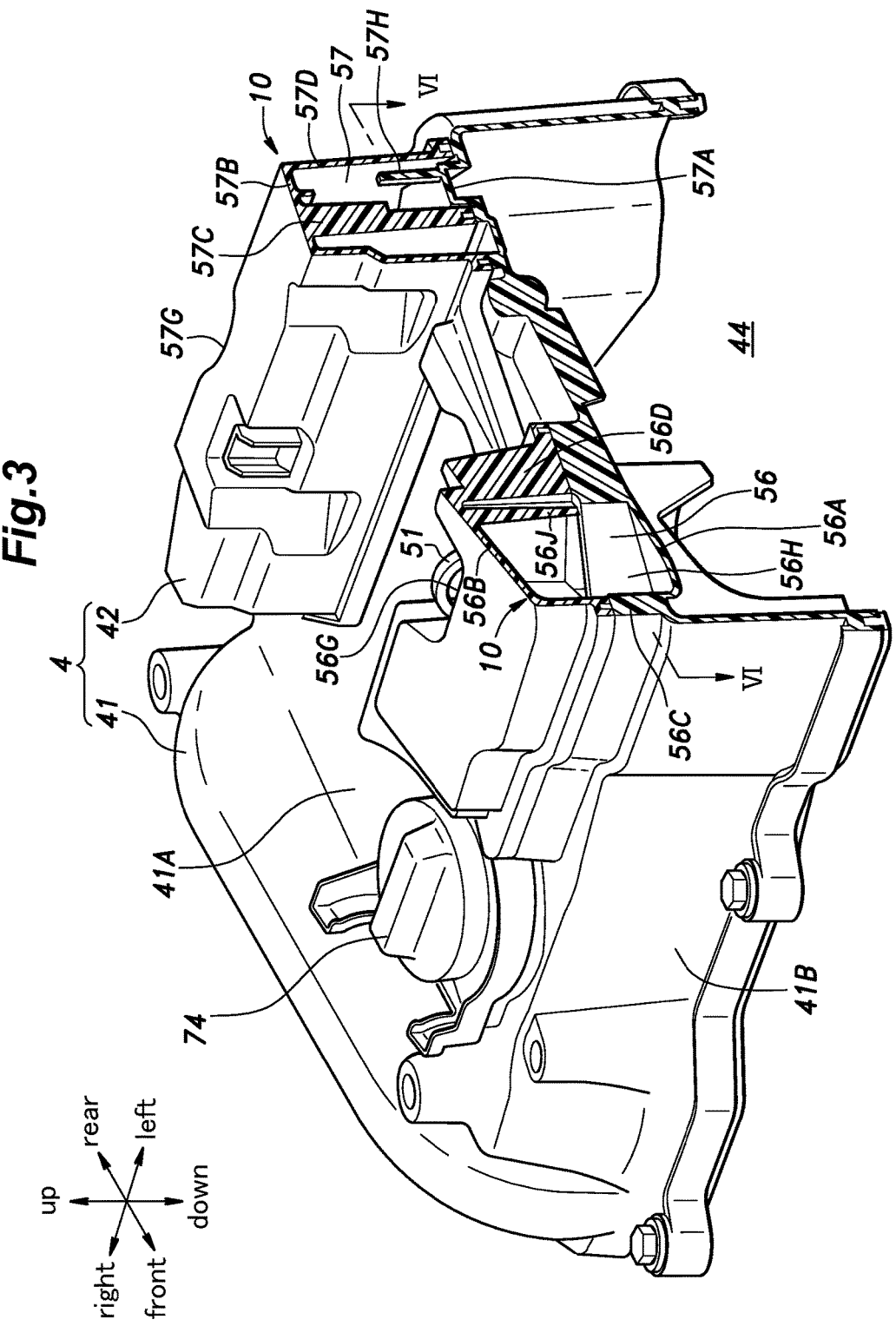
FIG. 3 is a sectional view taken along line III-III of FIG. 2.
Figure 4:
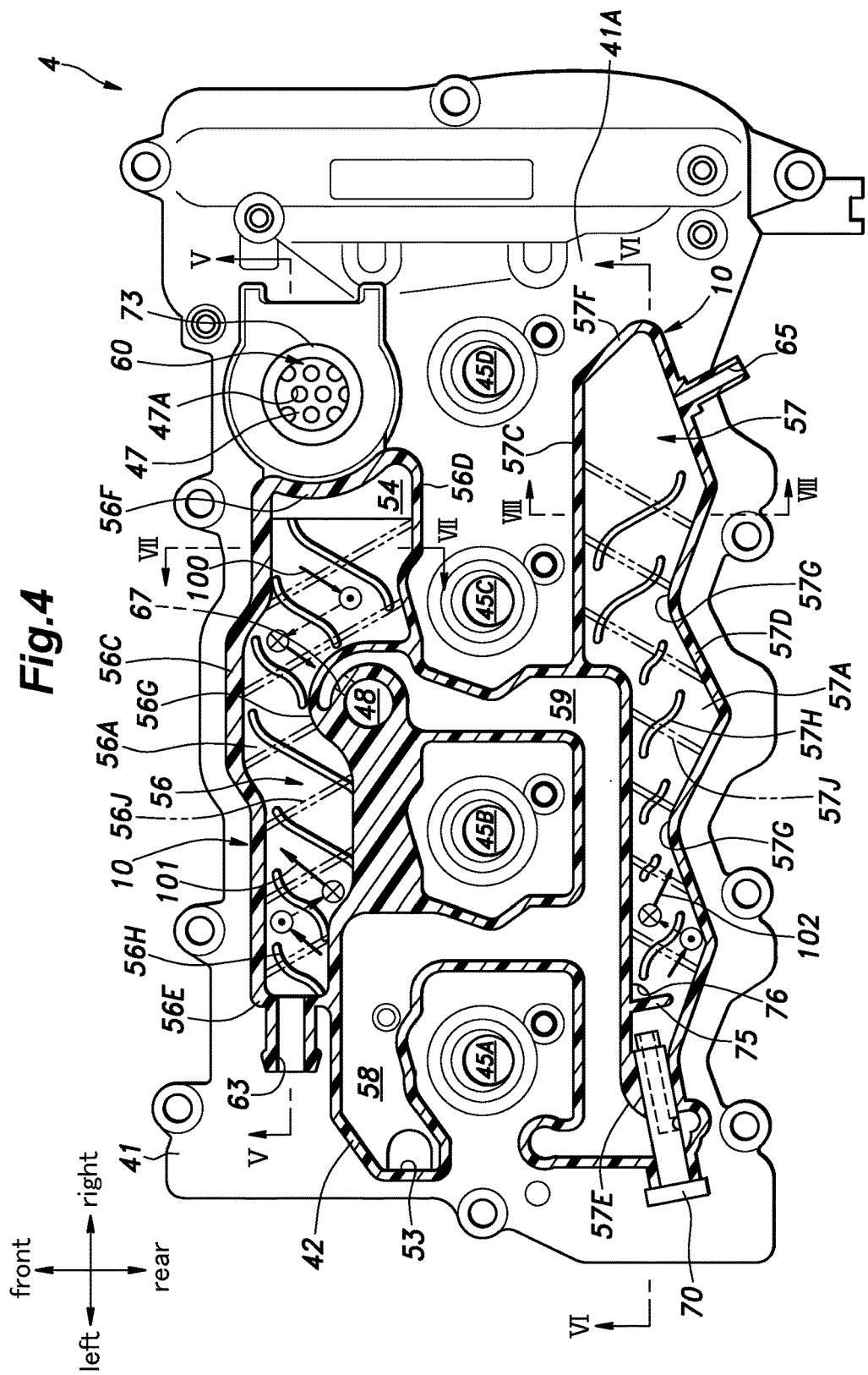
FIG. 4 is a sectional view taken along line IV-IV of FIG. 3.

As shown in FIGS. 2 to 4, the head cover 4 includes a first cover member 41 and a second cover member 42 that are connected to each other. The first cover member 41 is provided with an upper wall 41A and a side wall 41B extending downward from the side edge of the upper wall 41A along the entire circumference so as to define a box opening out in the lower end thereof. The first cover member 41 is connected to the cylinder head 3 so as to abut the upper peripheral part of the cylinder head 3 at the lower end of the side wall 41B, and cover the entire upper part of the cylinder head 3. A valve actuation chamber 44 is defined between the first cover member 41 and the cylinder head 3 to accommodate a per se known valve actuation mechanism including a camshaft and rocker arms.

As shown in FIGS. 2 and 4, the upper wall 41A of the first cover member 41 is formed with plug holes 45A to 45D for receiving spark plugs, respectively, at positions corresponding to the upper ends of the cylinders 8. Each plug hole 45A to 45D is passed through the upper wall 41A. The plug holes 45A to 45D are called as the first to the fourth plugs in that order from the left. Each plug hole 45A to 45D is closed by inserting the corresponding spark plug therein.

The upper wall 41A of the first cover member 41 is formed with a recess 47 which is recessed downward and located in front of the fourth plug hole 45D. A plurality of through holes 47A are passed through the bottom wall of the recess 47.

As shown in FIG. 4, a gauge hole 48 consisting of a through hole is formed in a part of the upper wall 41A of the first cover member 41 which is located between the second plug hole 45B and the third plug hole 45C in a forwardly offset manner. The lower end of the gauge hole 48 is connected to the upper end of the gauge passage 37. The oil level gauge 51 is provided with a plug (not shown in the drawings) adjacent to the base end thereof to close the gauge hole 48 by coming into contact with the wall of the gauge hole 48 when the oil level gauge 51 is fully inserted in the gauge hole 48.

A first gas inlet hole 53 consisting of a through hole is formed in a part of the upper wall 41A of the first cover member 41 which is located to the front left of the first plug hole 45. The lower end of the first gas inlet hole 53 is connected to the upper end of the first blow-by gas passage 36.

A vent hole 54 is formed in a part of the upper wall 41A of the first cover member 41 located between the third plug hole 45C and the fourth plug hole 45D in a forwardly offset manner. The vent hole 54 is provided to the left of the recess 47 for communicating the upper face side of the upper wall 41A and the valve actuation chamber 44.

The second cover member 42 is connected to the upper surface of the upper wall 41A of the first cover member 41, and between the upper wall 41A of the first cover member 41 and the second cover member 42 are defined a first gas liquid separation passage 56, a second gas liquid separation passage 57, a second blow-by gas passage 58, a third blow-by gas passage 59 and an oil feed passage 60. In other words, the first cover member 41 and the second cover member 42 serve as passage forming members for forming these passages 56 to 60. The first gas liquid separation passage 56 and the second gas liquid separation passage 57 jointly form the oil separation device 10.

As shown in FIGS. 2 to 4, the first gas liquid separation passage 56 extends laterally in front of the gauge hole 48. The left end of the first gas liquid separation passage 56 is located between the first and second plug holes 45A and 45B, and the right end of the first gas liquid separation passage 56 is located between the third and fourth plug holes 45C and 45D, with respect to the lateral direction. The upper end of the vent hole 54 communicates with the lower part of the right end of the first gas liquid separation passage 56.

The first gas liquid separation passage 56 is defined by various walls, including a lower wall 56A, an upper wall 56B, a front side wall 56C, a rear side wall 56D, a left side wall 56E and a right side wall 56F. The lower wall 56A is formed by the upper wall 41A of the first cover member 41, and the upper wall 56B is formed by the second cover member 42. The front side wall 56C, rear side wall 56D, left side wall 56E and right side wall 56F are defined by at least one of the first cover member 41 and the second cover member 42.

A middle part of the rear side wall 56D of the first gas liquid separation passage 56 is curved forward to avoid interference with the gauge hole 48. Therefore, the first gas liquid separation passage 56 includes a narrow section 56G having a narrower width (with respect to the fore and aft direction) than the adjoining parts, and has a smaller cross sectional area in the narrow section 56G than the adjoining part of the first gas liquid separation passage 56.

The left side wall 56E of the first gas liquid separation passage 56 is formed with a gas communication port 63. As shown in FIG. 1, the gas communication port 63 is connected to a node between the air cleaner 23 and the compressor 24A of the intake system 21 via a gas passage 64 formed by a hose or a tube. As will be discussed hereinafter, the gas communication port 63 functions as a fresh air inlet for introducing fresh air from the intake system 21 to the first gas liquid separation passage 56 as indicated by a white arrow in FIG. 2, and a blow-by gas outlet for expelling blow-by gas from the first gas liquid separation passage 56 to the exhaust system 31 as indicated by a solid arrow in FIG. 2.

As shown in FIGS. 2 to 4, the second gas liquid separation passage 57 extends laterally behind the row of the first to the fourth plug holes 45A to 45D. The left end of the second gas liquid separation passage 57 is located in a position corresponding to the first plug hole 45A, and the right end of the second gas liquid separation passage 57 is located in a position corresponding to the fourth plug hole 45D.

The second gas liquid separation passage 57 is defined by various walls, including a lower wall 57A, an upper wall 57B, a front side wall 57C, a rear side wall 57D, a left side wall 57E and a right side wall 57F. The lower wall 57A is formed by the upper wall 41A of the first cover member 41, and the upper wall 57B is formed by the second cover member 42. The front side wall 57C, rear side wall 57D, left side wall 57E and right side wall 57F are defined by at least one of the first cover member 41 and the second cover member 42.

As shown in FIG. 4, the left half of the front side wall 57C of the second gas liquid separation passage 57 is rearwardly offset relative to the right half thereof. Thereby, the right half of the second gas liquid separation passage 57 is wider with respect to the fore and aft direction than the left half thereof, and is hence provided with a larger cross sectional area than the left half thereof. The rear side wall 57D of the second gas liquid separation passage 57 consists of a serpentine wall extending in the lateral direction, presenting a wavy shape in plan view. Thereby, the second gas liquid separation passage 57 is provided with a plurality of narrowed sections 57G having a narrower width with respect to the fore and aft direction. The second gas liquid separation passage 57 has a smaller cross sectional area in the narrowed sections 57G than in the remaining part thereof.

A gas outlet port 65 is formed in the right end of the rear side wall 57D of the second gas liquid separation passage 57. The gas outlet port 65 is connected to the downstream side of the intake system 21 or, more specifically, to the intake manifold 26 via a blow-by gas supply passage 66 formed by a hose or a tube. As indicated by the solid arrow in FIG. 2, the gas outlet port 65 functions as a blow-by gas outlet for expelling the blow-by gas from the second gas liquid separation passage 57 to the side of the intake system 21.

As shown in FIG. 4, the blow-by gas passage 58 extends from a terminal end thereof located in a front left part of the first plug hole 45A rightward along a front part of the first plug hole 45A, and after bending rearward, extends rearward between the first plug hole 45A and the second plug hole 45B. Thereafter, the blow-by gas passage 58 extends leftward in front of the second gas liquid separation passage 57, and reaches the left side of the left side wall 57E of the second gas liquid separation passage 57. This terminal end (the second terminal end) of the second gas liquid separation passage 57 adjoins the left end (the first terminal end) of the second gas liquid separation passage 57.

The first gas inlet hole 53 communicates with a lower part of one of the terminal ends of the second blow-by gas passage 58. The lower wall of the second blow-by gas passage 58 is inclined such that the first terminal end in the front is lower than the second terminal end in the rear. Thereby, the liquid that has collected on the lower wall at the second terminal end of the second blow-by gas passage 58 is caused to flow along the inclined lower wall to the first gas inlet hole 53 located in the first terminal end of the second blow-by gas passage 58 under the action of the gravity.

The third blow-by gas passage 59 extends from a first terminal end thereof located ahead of the gauge hole 48 and behind the first gas liquid separation passage 56, rearward between the gauge hole 48 and the first gas liquid separation passage 56, and further between the second plug hole 45B and the third plug hole 45C. Thereafter, the third blow-by gas passage 59 bends leftward, and after extending leftward between the second plug hole 45B and the second gas liquid separation passage 57, is connected to the second blow-by gas passage 58 at the second terminal end thereof. The first terminal end of the third blow-by gas passage 59 is connected to the gauge hole 48 via a second gas inlet port 67 consisting of a passage extending radially from the gauge hole 48. One end of the second gas inlet port 67 is located below the plug portion of the fully inserted oil level gauge 51 in the gauge hole 48. Therefore, when the oil level gauge 51 is fully inserted in the gauge hole 48, communication between the gauge hole 48 and the second gas inlet port 67 can be maintained.

The lower wall of the third blow-by gas passage 59 is inclined such that the one end thereof located in the front is lower than the other end thereof located in the back. Thereby, the liquid that has collected on the lower wall at the other end of the third blow-by gas passage 59 flows along the inclined lower wall, and reaches the second gas inlet port 67 located in the one end of the third blow-by gas passage 59 under the action of the gravity.

Figure 6:
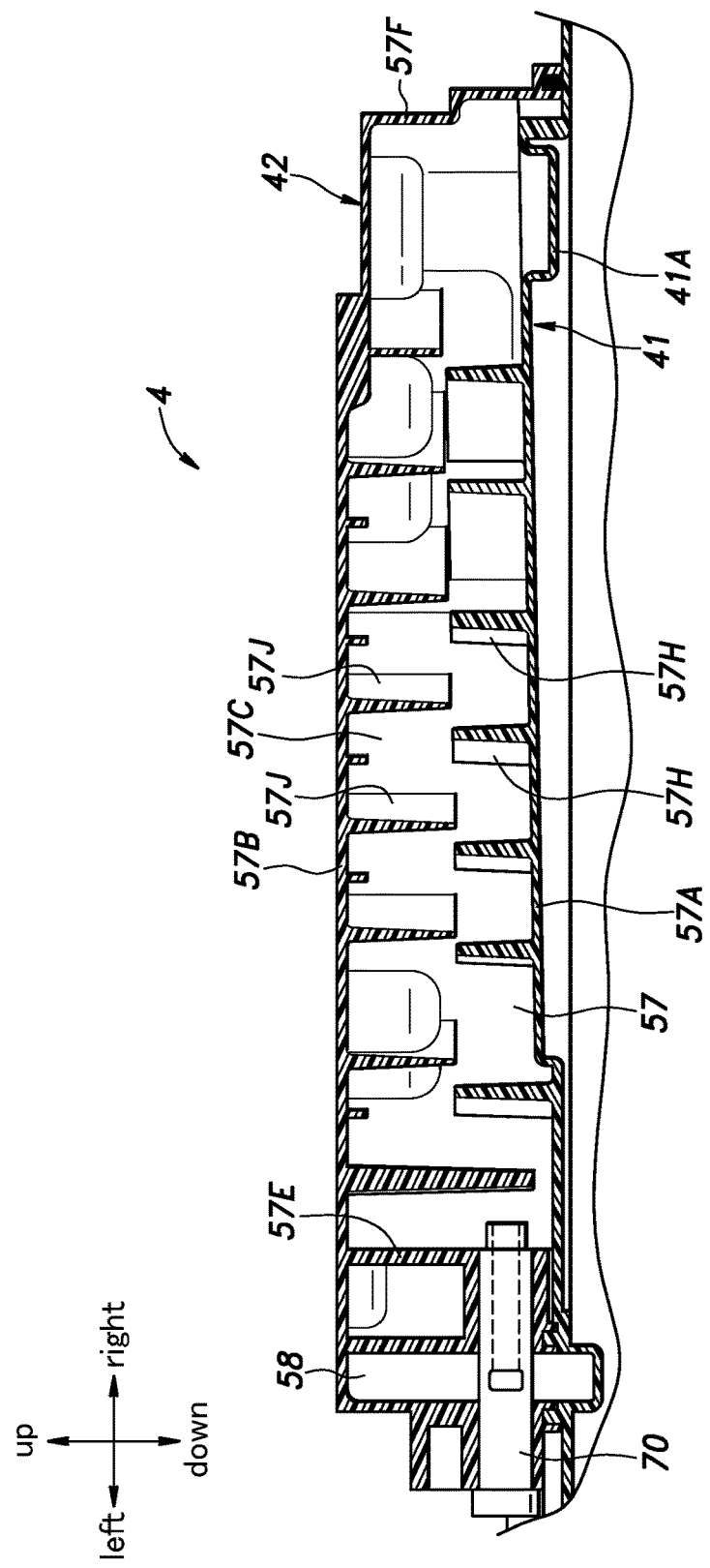
FIG. 6 is a sectional view taken along line VI-VI of FIG. 4.

As shown in FIGS. 4 and 6, a PCV valve 70 is fitted into a through hole formed in the left side wall 57E of the second gas liquid separation passage 57 located between the second blow-by gas passage 58 and the second gas liquid separation passage 57. The PCV valve 70 includes a housing defining an internal passage communicating the second blow-by gas passage 58 and the second gas liquid separation passage 57 with each other, a valve seat provided in the inner passage and facing the second gas liquid separation passage 57, a valve member configured to be seated on the valve seat and a biasing member for urging the valve member onto the valve seat. The PCV valve 70 is initially closed by the valve member being seated on the valve seat under the biasing force of the biasing member. When the pressure on the side of the second gas liquid separation passage 57 is lower than the pressure on the side of the second blow-by gas passage 58, the valve member is lifted from the valve seat to permit the flow of gas from the side of the second blow-by gas passage 58 to side of the second gas liquid separation passage 57.

The PCV valve 70 is passed through the wall of the second cover member 42 defining the second blow-by gas passage 58, and extends to the left side wall 57E of the second gas liquid separation passage 57. Therefore, the PCV valve 70 can be installed in the left side wall 57E of the second gas liquid separation passage 57 from outside.

As shown in FIGS. 2 and 4, the oil feed passage 60 is defined by the recess 47 formed in the upper wall 41A of the first cover member 41 and the second cover member 42 covering the recess 47. The part of the second cover member 42 covering the recess 47 is provided with a tube portion 73 projecting upward. The tube portion 73 internally defines a passage which is open on both ends thereof. As shown in FIG. 3, the upper opening of the tube portion 73 is provided with a detachable cap 74 so that oil may be filled into the upper open end of the tube portion 73 by removing the cap 74 from the tube portion 73. The oil that has been filled into the tube portion 73 flows onto the upper surface of the cylinder head 3 via the through holes 47A formed in the bottom wall of the recess 47, and then flows into the oil chamber 33 via the oil return passage 35.

Figure 7:
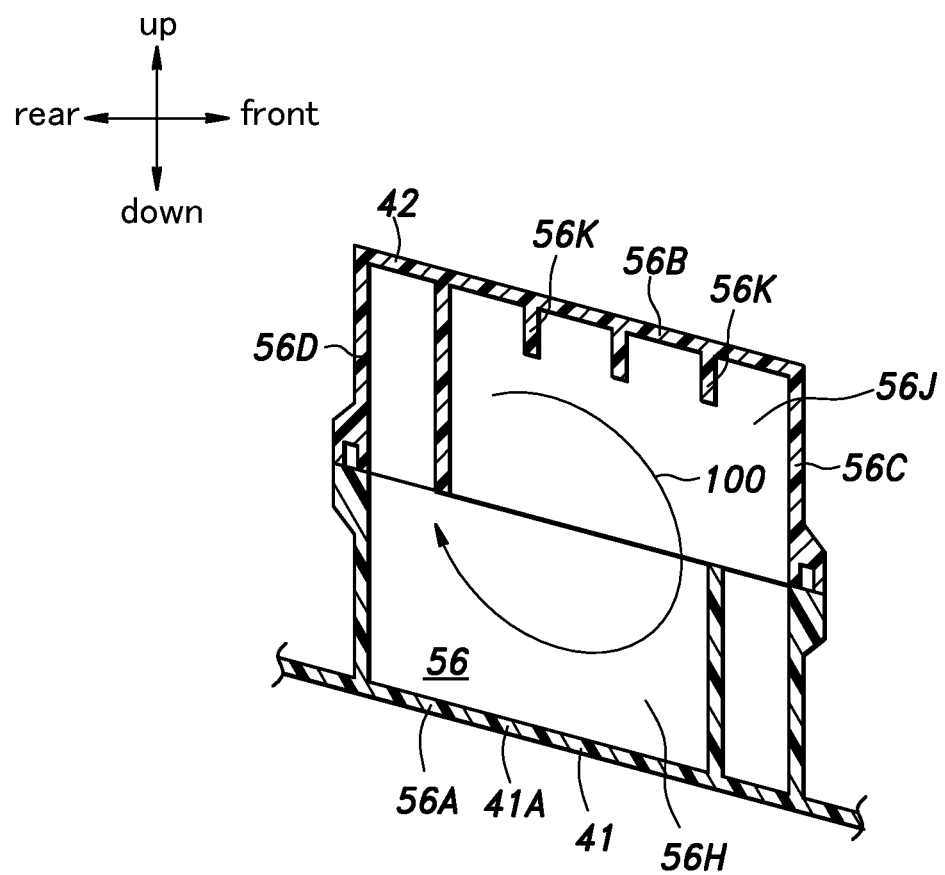
FIG. 7 is a sectional view taken along line VII-VII of FIG. 4.

As shown in FIG. 7, the upper surface of the lower wall 56A of the first gas liquid separation passage 56 is inclined with respect to the horizontal surface such that the front part (on the side of the front side wall 56C) is lower than the rear part (on the side of the rear side wall 56D). The lower surface of the upper wall 56B of the first gas liquid separation passage 56 is in parallel with the upper surface of the lower wall 56A. The front side wall 56C and the rear side wall 56D of the first gas liquid separation passage 56 extends vertically. Therefore, the cross section (extending perpendicularly to the lengthwise or lateral direction of the first gas liquid separation passage 56) is provided with a parallelepiped shape. The upper surface of the lower wall 56A of the first gas liquid separation passage 56 is inclined with respect to the horizontal surface so that the right end is lower than the left end.

As shown in FIGS. 3 to 5 and FIG. 7, a plurality of lower partition walls 56H project upward from the upper surface of the lower wall 56A of the first gas liquid separation passage 56. Each lower partition wall 56H consists of a plate member, and has a certain horizontal length. The lower partition walls 56H extend in parallel with one another in plan view, and are spaced from one another by a regular spacing with respect to the lateral direction. Each lower partition wall 56H extends in a first direction which is tilted with respect to the lateral direction in plan view. More specifically, each lower partition wall 56H extends in the forwardly and rightward direction (in the first direction) so that the front end is positioned to the right of the rear end.

The rear end of each lower partition wall 56H is connected to the rear side wall 56D of the first gas liquid separation passage 56. Meanwhile, the front end of each lower partition wall 56H defines a free end spaced from the front side wall 56C, defining a gap with respect to the front side wall 56C. The front end of each lower partition wall 56H is curved in the rightward direction with a progressively increasing curvature toward the front end thereof. The vertical dimension of each lower partition wall 56H is about one half of the distance between the lower wall 56A and the upper wall 56B.

A plurality of upper partition walls 56J project downward from the lower surface of the upper wall 56B of the first gas liquid separation passage 56. Each upper partition wall 56J consists of a plate member, and has a certain horizontal length. The upper partition walls 56J extend in parallel with one another in plan view, and are spaced from one another by a regular spacing with respect to the lateral direction. Each upper partition wall 56J extends in a second direction which is tilted with respect to the lateral direction in plan view. More specifically, each upper partition wall 56J extends in the forwardly and leftward direction (in the second direction) so that the front end is positioned to the left of the rear end. The first and second directions are symmetric with respect to a line of symmetry extending in the lateral direction.

Figure 5:
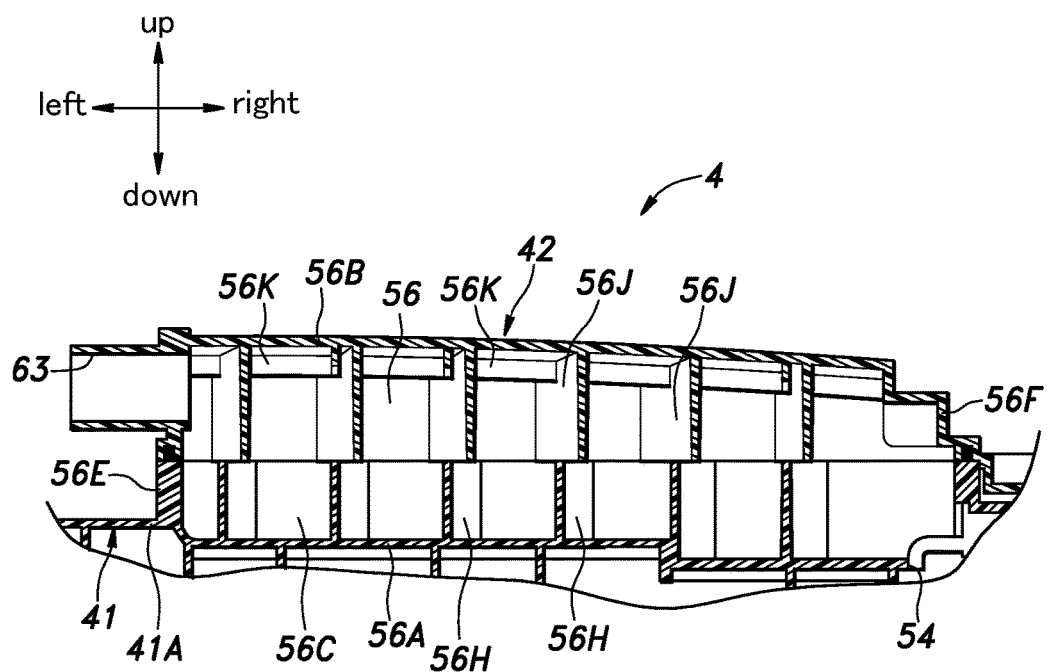
FIG. 5 is a sectional view taken along line V-V of FIG. 4.

The rear end of each upper partition wall 56J is connected to the rear side wall 56D of the first gas liquid separation passage 56, and the front end of each upper partition wall 56J is connected to the front side wall 56C of the first gas liquid separation passage 56. The vertical dimension of each upper partition wall 56J is about one half of the distance between the lower wall 56A and the upper wall 56B. In plan view, each upper partition wall 56J crosses at least one of the lower partition walls 56H. As shown in FIGS. 5 and 7, at each of the intersections between the upper partition walls 56J and the lower partition walls 56H, the lower end surface of the corresponding upper partition wall 56J and the upper end surface of the corresponding lower partition wall 56H abut each other. In other words, the lower end surface of each upper partition wall 56J includes a part that contacts the upper end surface of the corresponding lower partition wall 56H.

As shown in FIGS. 4 and 7, the upper partition walls 56J and the lower partition walls 56H jointly define a spiral passage of a clockwise turn in the first gas liquid separation passage 56. Thus, when gas flows from the vent hole 54 to the gas communication port 63, as shown by arrows 100 in FIGS. 4 and 7, the gas flows leftward and forward along the first upper partition wall 56J, downward along the front side wall 56C, leftward and rearward along the subsequent lower partition wall 56H, and upward along the rear side wall 56D, or flows in a clockwise spiral pattern. Also, when gas flows from the gas communication port 63 to the vent hole 54, as shown by arrows 101 in FIG. 4, the gas flows rightward and rearward along the upper partition wall 56J, downward along the rear side wall 56D, rightward and forward along the subsequent lower partition wall 56H, and upward along the front side wall 56C, or flows in a clockwise spiral pattern.

As shown in FIGS. 5 and 7, a plurality of ribs 56K extending laterally project downward from the lower surface of the upper wall 56B of the first gas liquid separation passage 56, and are arranged in the fore and aft direction at a regular interval. The projecting length of the ribs 56K is smaller than the downward projecting length of the upper partition walls 56J.

As shown in FIGS. 3, 4, 6 and 8, the upper surface of the lower wall 57A of the second gas liquid separation passage 57 is inclined with respect to the horizontal surface such that the front part (on the side of the front side wall 57C) is lower than the rear part (on the side of the rear side wall 57D). The lower surface of the upper wall 57B of the second gas liquid separation passage 57 is in parallel with the lower surface of the lower wall 57A. The front side wall 57C and the rear side wall 57D of the second gas liquid separation passage 57 extend vertically. Therefore, the cross section (extending perpendicularly to the lengthwise or lateral direction of the second gas liquid separation passage 57) is provided with a parallelepiped shape. The upper surface of the lower wall 57A of the second gas liquid separation passage 57 is inclined with respect to the horizontal surface so that the left end is lower than the right end.

A plurality of lower partition walls 57H project upward from the upper surface of the lower wall 57A of the second gas liquid separation passage 57. Each lower partition wall 57H consists of a plate member, and has a certain horizontal length. The lower partition walls 57H extend in parallel with one another in plan view, and are spaced from one another by a regular spacing with respect to the lateral direction. Each lower partition wall 57H extends in a third direction which is tilted with respect to the lateral direction in plan view. More specifically, each lower partition wall 57H extends in the forwardly and leftward direction (in the third direction) so that the front end is positioned to the left of the rear end.

The front end of each lower partition wall 57H defines a free end spaced from the front side wall 57C, defining a gap with respect to the front side wall 57C. Meanwhile, the rear end of each lower partition wall 57H defines a free end spaced from the rear side wall 57D, defining a gap with respect to the rear side wall 57D. The front end of each lower partition wall 57H is curved in the leftward direction with a progressively increasing curvature toward the front end thereof, and the rear end of each lower partition wall 57H is curved in the rightward direction with a progressively increasing curvature toward the rear end thereof. The vertical dimension each lower partition wall 57H is about one half of the distance between the lower wall 57A and the upper wall 57B.

A plurality of upper partition walls 57J project downward from the lower surface of the upper wall 57B of the second gas liquid separation passage 57. Each upper partition wall 57J consists of a plate member, and has a certain horizontal length. The upper partition walls 57J extend in parallel with one another in plan view, and are spaced from one another by a regular spacing with respect to the lateral direction. Each upper partition wall 57J extends in a fourth direction which is tilted with respect to the lateral direction in plan view. More specifically, each upper partition wall 57J extends in the forwardly and rightward direction (in the fourth direction) so that the front end is positioned to the right of the rear end. The third and fourth directions are symmetric with respect to a line of symmetry extending in the lateral direction.

Figure 8:
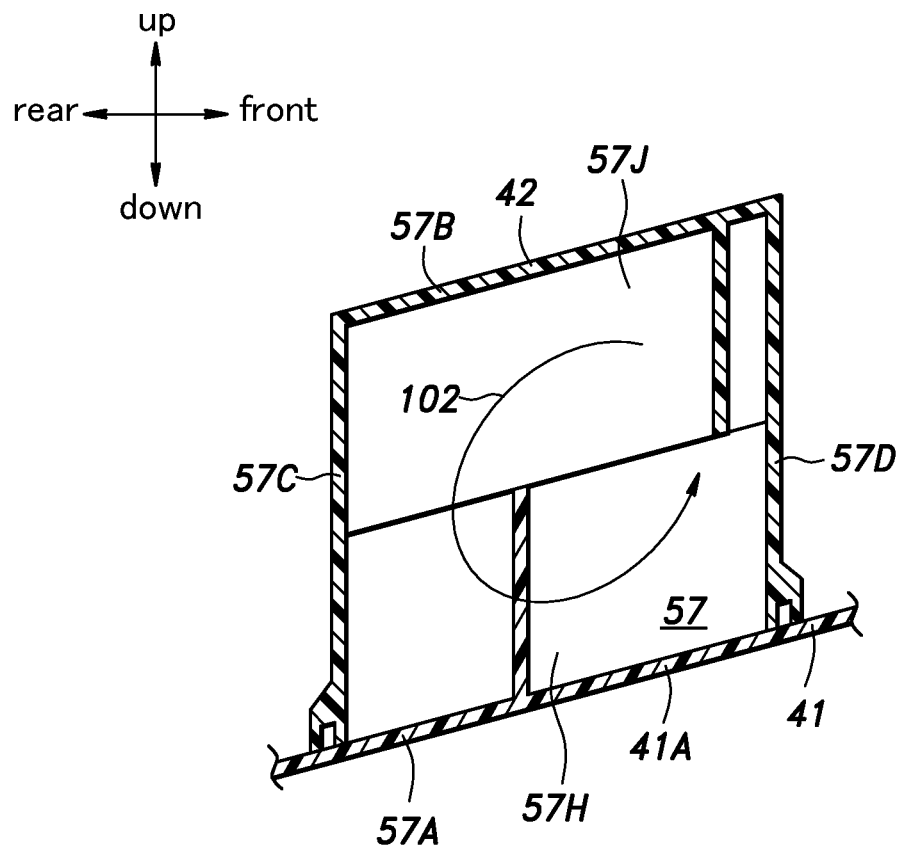
FIG. 8 is a sectional view taken along line VIII-VIII of FIG. 4.

The rear end of each upper partition wall 57J is connected to the rear side wall 57D of the second gas liquid separation passage 57, and the front end of each upper partition wall 57J is connected to the front side wall 57C of the second gas liquid separation passage 57. The vertical dimension of each upper partition wall 57J is about one half of the distance between the lower wall 57A and the upper wall 57B. In plan view, each upper partition wall 57J crosses at least one of the lower partition walls 57H. As shown in FIGS. 6 and 8, at each of the intersections between the upper partition walls 57J and the lower partition walls 57H, the lower end surface of the corresponding upper partition wall 57J and the upper end surface of the corresponding lower partition wall 57H abut each other. In other words, the lower end surface of each upper partition wall 57J includes a part that contacts the upper end surface of the corresponding lower partition wall 57H.

As shown in FIGS. 4 and 8, the upper partition walls 57J and the lower partition walls 57H jointly define a spiral passage of a counter clockwise turn in the second gas liquid separation passage 57. Thus, when gas flows from the PCV valve 70 to the gas outlet port 65, as shown by arrows 102 in FIGS. 4 and 8, the gas flows rightward and forward along the second upper partition wall 57J, downward along the front side wall 57C, rightward and rearward along the subsequent lower partition wall 57H, and upward along the rear side wall 57D, or flows in a clockwise spiral pattern.

A baffle wall 75 projects rearward from the rear side of the left end part of the front side wall 57C of the second gas liquid separation passage 57 so as to oppose the opening of the PCT valve 70 on the side of the second gas liquid separation passage 57. An oil discharge hole 76 is passed downward through a part of the front left end part of the lower wall 57A of the second gas liquid separation passage 57 located to the right of the baffle wall 75. The oil discharge hole 76 communicates the second gas liquid separation passage 57 with the valve actuation chamber 44.

The flow of the blow-by gas and the flow of the fresh air in the internal combustion engine 1 discussed above are described in the following. Under a low load condition of the internal combustion engine 1, the turbocharger is not in operation. Under this condition, the part of the intake system 21 on the downstream side of the throttle valve 25 is placed in a negative pressure condition during the downward stroke of the pistons 14, and is therefore lower in pressure than the upstream side of the throttle valve 25. The negative pressure on the downstream side of the throttle valve 25 is supplied to the second gas liquid separation passage 57 via the blow-by gas supply passage 66, and opens the PCV valve 70. As a result, the blow-by gas in the crankcase chamber 11 flows into the second blow-by gas passage 58 via at least one of the paths or the path that passes through the first blow-by gas passage 36 and the first gas inlet hole 53 and the path that passes through the gauge passage 37, the second gas inlet port 67 and the third blow-by gas passage 59. Thereafter, the blow-by gas passes through the PCV valve 70, the second gas liquid separation passage 57 and the blow-by gas supply passage 66. See the solid arrows in FIG. 1.

The oil mist contained in the blow-by gas is removed from the blow-by gas by adhering to the wall of the various passages, in particular the second gas liquid separation passage 57. As the blow-by gas flows in the second gas liquid separation passage 57 as a spiral flow centered around the central axial line extending in the lengthwise direction, the centrifugal force pushes the oil mist radially outward, and causes the oil mist to adhere to the various walls 57A to 57F, and the lower partition walls 57H and the upper partition walls 57J.

At the same time as the blow-by gas in the crankcase chamber 11 is expelled to the intake system 21, the fresh air on the upstream side of the throttle valve 25 in the intake system 21 flows into the crankcase chamber 11 via the gas passage 64, the gas communication port 63, the first gas liquid separation passage 56, the vent hole 54, the valve actuation chamber 44 and the oil return passage 35 in that order. Thereby, the crankcase chamber 11 is ventilated. See the white arrows in FIG. 1.

Under a high load condition of the internal combustion engine 1, the turbocharger is in operation so that the part of the intake system 21 downstream of the compressor 24A is under a positive pressure which is higher than the pressure on the upstream side of the compressor 24A. The positive pressure on the downstream side of the compressor 24A is supplied to the second gas liquid separation passage 57 via the blow-by gas supply passage 66, and closes the PCV valve 70. As a result, the blow-by gas in the crankcase chamber 11 flows into the upstream side of the compressor 24A of the intake system 21 via the oil return passage 35, the valve actuation chamber 44, the vent hole 54, the first gas liquid separation passage 56, the gas communication port 63 and the gas passage 64 in that order, instead of flowing through the first blow-by gas passage 36 and the gauge passage 37. See the solid arrows in FIG. 1. In other words, under a high load condition, the blow-by gas flows in the opposite direction to the fresh air, or reverses the flow of the fresh air through the gas passage 64, the communication port 63, the first gas liquid separation passage 56, the vent hole 54, the valve actuation chamber 44 and the oil return passage 35, in that order.

The oil mist contained in the blow-by gas is removed from the blow-by gas by adhering to the wall of the various passages, in particular the first gas liquid separation passage 56. As the blow-by gas flows in the first gas liquid separation passage 56 as a spiral flow centered around the central axial line extending in the lengthwise direction, the centrifugal force pushes the oil mist radially outward, and causes the oil mist to adhere to the various walls 56A to 56F, and the lower partition walls 56H and the upper partition walls 56J.

The action and the advantages of the oil separation device 10 of the internal combustion engine 1 of the first embodiment are described in the following. Because the first gas liquid separation passage 56 and the second gas liquid separation passage 57 are formed as spiral passages, the blow-by gas that flows these passages is converted into a spiral flow. As a result, the oil contained in the gas is caused to adhere to the various walls 56A to 56F and 57A to 57F, the lower partition walls 56H and 57H and the upper partition walls 56J and 57J, and is thereby separated from the gas. The lower partition walls 56H and 57H and the upper partition walls 56J and 57J define spiral passages so that the flow resistance is reduced, and the decrease in the flow velocity of the gas can be minimized as compared to the case where labyrinth passages are used.

The lower wall 56A of the first gas liquid separation passage 56 is inclined in a downward direction as the gas flows from the vent hole 54 (functioning as a gas inlet) to the gas communication port 63 (functioning as a gas outlet), and therefore opposes the spiral flow of the gas with a clockwise turn. This promotes the adherence of the oil in the blow-by gas on the lower wall 56A so that the oil separation performance can be improved. The oil that has adhered to the lower wall 56A is conducted toward the upstream part (front part) on the inclined lower wall 56A under the gravitational force, and is collected therein. Likewise, in the second gas liquid separation passage 57, the lower wall 57A is inclined in a downward direction as the gas flows from the PCV valve 70 (functioning as a gas inlet) to the gas outlet port 65, and therefore opposes the spiral flow of the gas with a clockwise turn. This promotes the adherence of the oil in the blow-by gas on the lower wall 57A so that the oil separation performance can be improved. The oil that has adhered to the lower wall 57A is caused to flow toward the upstream part (rear part) on the lower wall 57A under the gravitational force.

In the first gas liquid separation passage 56, because the lower wall 56A and the front side wall 56C define an acute angle therebetween, the gas flowing through the spiral passage is sharply bent along the front side wall 56C and the lower wall 56A at the boundary between the front side wall 56C and the lower wall 56A so that the adherence of the oil in the blow-by gas to the lower wall 56A is promoted even further. Similarly, in the second gas liquid separation passage 57, because the lower wall 57A and the front side wall 57C define an acute angle therebetween, the gas flowing through the spiral passage is sharply bent along the front side wall 57C and the lower wall 57A at the boundary between the front side wall 57C and the lower wall 57A so that the adherence of the oil in the gas to the lower wall 57A is promoted even further.

Because the cross section of the first gas liquid separation passage 56 is in the shape of a parallelepiped, and the rear side wall 56D and the upper wall 56B define a sharp angle, the adherence of oil to the upper wall 56B is promoted. The gas that flows along the upper wall 56B collides with the ribs 56K, and thereby effectively sheds the oil contained therein. The oil that has adhered to the upper wall 56B and the ribs 56K drops onto the lower wall 56A, and is thence collected in the front part of the lower wall 56A.

Because the cross section of the second gas liquid separation passage 57 is in the shape of a parallelepiped, adherence of oil onto the upper wall 57B is promoted owing to the fact that an acute angle is defined between the rear side wall 57D and the upper wall 57B. The oil that has adhered to the upper wall 57B drips along the upper wall 57B and the front side wall 57C to the lower wall 57A, or drops onto the lower wall 57A, and is collected in the front part of the lower wall 57A.

In the first gas liquid separation passage 56, because a gap is defined between the front end of each lower partition wall 56H and the front side wall 56C, the oil that has been collected in the front part of the lower wall 56A can move in the lateral direction. In the first embodiment, because the upper surface of the lower wall 56A of the first gas liquid separation passage 56 is inclined such that the right end of the lower wall 56A is lower than the left end thereof, the oil that has been collected in the front part of the lower wall 56A can flow rightward, and be expelled to the valve actuation chamber 44 via the vent hole 54.

In the second gas liquid separation passage 57, because a gap is defined between the front end of each lower partition wall 57H and the front side wall 57C, the oil that has been collected in the front part of the lower wall 57A can move in the lateral direction. In the first embodiment, because the upper surface of the lower wall 57A of the second gas liquid separation passage 57 is inclined such that the left end of the lower wall 57A is lower than the right end thereof, the oil that has been collected in the front part of the lower wall 57A can flow leftward, and be expelled to the valve actuation chamber 44 via the oil discharge hole 76.

The lower partition walls 56H and 57H, and the upper partition walls 56J and 57J of the first and second gas liquid separation passages 56 and 57 are arranged such that the lower end surface of each upper partition wall 56J, 57J is located higher than the upper end surface of the corresponding lower partition wall 56H, 57H, and in plan view, each upper partition wall 56J, 57J crosses at least one of the lower partition walls 56H, 57H. Because the lower partition walls 56H and 57H, and the upper partition walls 56J and 57J do not interfere with one another, the number of the lower partition walls 56H and 57H, and the upper partition walls 56J and 57J in the first and second gas liquid separation passages 56 and 57 can be increased. By increasing the number of the lower partition walls 56H and 57H, and the upper partition walls 56J and 57J, the number of turns of the spiral passage for a given length of the passage can be increased. Therefore, the number of turns of the gas that passes through the first and second gas liquid separation passages 56 and 57 can be increased, and the oil separation performance can be improved.

Because the lower surfaces of the upper partition walls 56J and 57J have parts that contact the upper surfaces of the lower partition walls 56H and 57H, the outer profiles of the spiral passages can be even better defined by the lower partition walls 56H and 57H and the upper partition walls 56J and 57J. Thereby, the blow-by gas conducted through these spiral passages can be converted into a spiral flow in a highly reliable manner.

The flow velocity of the blow-by gas in the first and second gas liquid separation passages 56 and 57 is increased at each of the narrowed sections 56G and 57G, and the centrifugal force acting on the oil in the blow-by gas increases in such regions. Thereby, the oil separation performance can be improved.

The first and second gas liquid separation passages 56 and 57 can be defined in a highly simple manner by defining them between the first and second cover members 42 which are joined to each other. In particular, because the lower walls 56A and 57A, and the lower partition walls 56H and 57H are formed by the first cover member 41, and the upper walls 56B and 57B, and the upper partition walls 56J and 57J are formed by the second cover member 42, the spiral passages having relatively complex configurations can be formed in a highly simple manner.

Second Embodiment

In the second embodiment, the internal combustion engine of the present invention consists of an automotive, in-line, four-cylinder engine (L4 engine). The directions mentioned in the following description are based on the directions of the vehicle shown in FIG. 10.

In the second embodiment, the vertical direction corresponds to the plumb vertical direction of the engine when installed on a vehicle body. The first end of the cylinder row corresponds to the left side of the vehicle on which the engine is mounted, and the second end of the engine corresponds to the right side of the vehicle on which the engine is mounted or the side on which the chain case of the engine is provided. The upper side corresponds to the side where the head cover is provided, and the lower side corresponds to the side where the oil pan of the engine is provided. The front side corresponds to the side where the exhaust camshaft is provided, and the rear side corresponds to the side where the intake camshaft is provided. The cylinder row direction corresponds to the lengthwise direction of the cylinder head 213.

Figure 9:
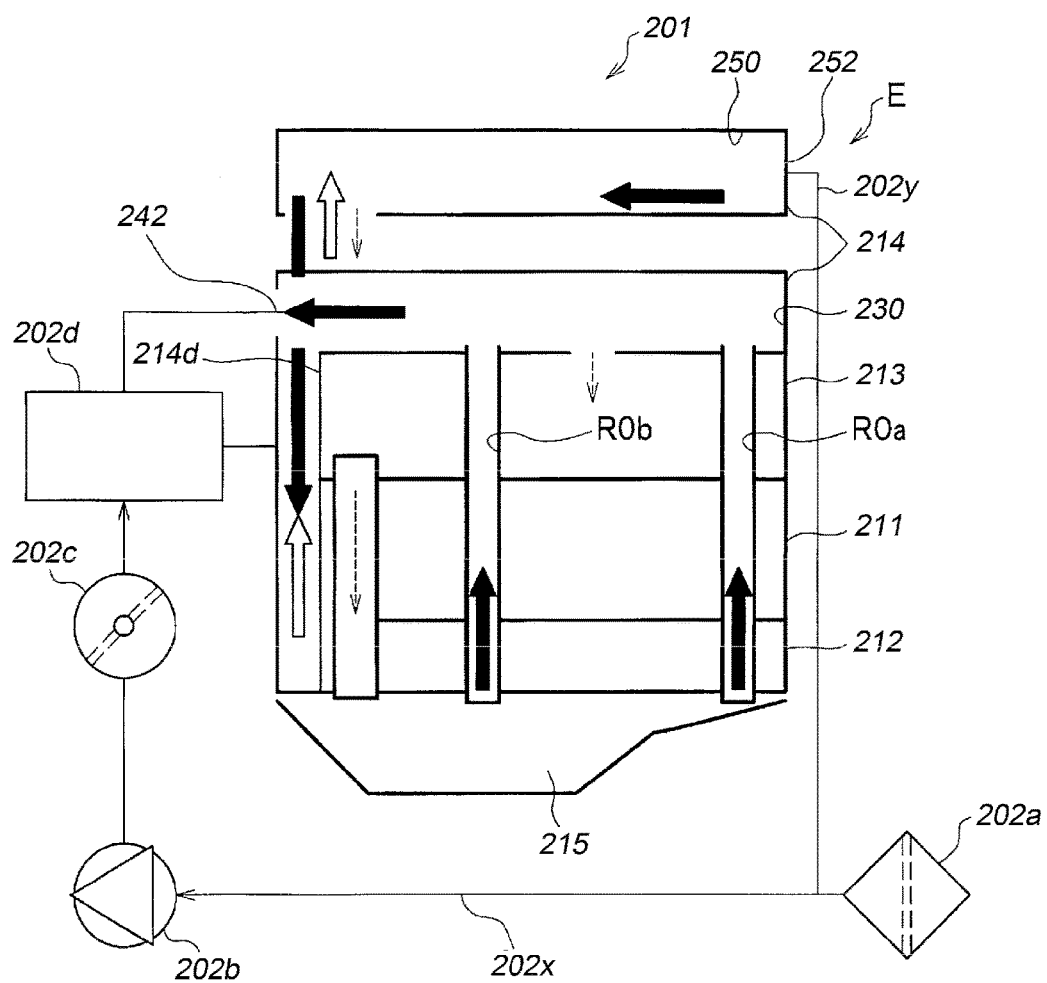
FIG. 9 is a diagram of an internal combustion engine given as a second embodiment of the present invention.

As shown in FIG. 9, the engine E of the illustrated embodiment includes an engine main body essentially consisting of a cylinder block 211, a lower block 212, a cylinder head 213, a head cover 214 and an oil pan 215.

<Cylinder Block>

The cylinder block 211 mainly defines cylinder bores and a crankcase chamber although not shown in the drawings. The cylinder block 211 is internally provided with pistons, connecting rods and a crankshaft.

<Lower Block>

The lower block 212 internally defines a crankcase chamber in cooperation with the cylinder block 211, and is positioned under the cylinder block 211. In the illustrated embodiment, the crankshaft is rotatably supported by a plurality of upper crank journals formed on the lower surface of the cylinder block 211 and a plurality of lower crank journals formed on the upper surface of the lower block 212.

<Cylinder Head>

The cylinder head 213 defines combustion chambers by recesses formed on the bottom surface thereof in parts corresponding to the cylinder bores formed in the cylinder block 211, in cooperation with the top surfaces of the piston slidably received in the cylinder bores. The cylinder head 213 is internally formed with intake ports and exhaust ports communicating with the combustion chambers, and is provided with intake valves and exhaust valves for selectively closing the intake ports and the exhaust ports, respectively. A valve actuation chamber is defined on the top side of the cylinder head for receiving rocker arms and other components of a valve actuation mechanism. In particular, the valve actuation chamber accommodates an intake camshaft and an exhaust cam shaft which are actuated by the crankshaft.

<Head Cover>

The head cover 214 is a cover member covering the upper side of the cylinder head 213 to define the valve actuation chamber. A gas liquid separation chamber is defined inside the head cover 214 or on the top side of the head cover 214 by the head cover 214 alone or in combination with other members.

<Oil Pan>

The oil pan 215 receives the oil dripping thereinto after lubricating various parts of the internal combustion engine E, and stores the received oil. The oil pan 215 is connected to the lower end of the lower block 212, and is internally provided with an oil strainer via which oil is supplied to an oil pump for supplying oil under pressure to various parts of the internal combustion engine E.

The internal combustion engine E is provided with a supercharger. An intake passage 202x of the engine E is provided with an air cleaner 202a, a compressor 202b forming a part of the turbocharger, a throttle valve 202c and an intake manifold 202d.

<Blow-by Gas>

Blow-by gas is a mixture of un-combusted gas, which is produced in the combustion chambers and has leaked into the crankcase chamber, and oil mist. The blow-by gas is conducted to a breather system 201 (gas liquid separation passage, oil separation device) of the internal combustion engine E via a breather passage.

In FIG. 9, the solid arrows indicate the flow of blow-by gas and fresh air when the intake passage 202x is in a negative pressure condition or when the supercharger is not in operation. The white arrows indicate the flow of blow-by gas when the intake passage 202x is in a positive pressure condition or when the supercharger is in operation. The dotted arrows indicate the flow of oil that has been separated from the blow-by gas.

In this engine E, the fresh air that has been admitted via the air cleaner 202a is compressed by the compressor 202b, and is supplied to the main body of the internal combustion engine E via the throttle valve 202c and the intake manifold 202d.

Owing to the negative pressure produced in the intake passage 202x during the intake stroke, the blow-by gas that has leaked from the combustion chambers to the crankcase chamber in the internal combustion engine E is introduced into the intake passage 202x via the breather passages R0a and R0b. When the blow-by gas flows down the breather chamber R2, oil is separated from the blow-by gas, and the blow-by gas freed from the oil is returned to the combustion chambers to be combusted once again via the intake manifold 202d. Because the pressure in the internal combustion engine drops when the blow-by gas is returned to the intake system, part of the fresh air introduced into the intake passage is supplied to the interior of the internal combustion engine E via a fresh air chamber R3 to scavenge the interior of the internal combustion engine E.

Under a high load condition of the internal combustion engine E or under a medium load and high rpm condition of the internal combustion engine E, the part of the intake passage 202x downstream of the compressor 202b is placed under a positive pressure condition. Therefore, a one way valve 242 of the breather chamber R2 is closed so that the returning flow of the blow-by gas from the breather chamber R2 ceases. Under this condition, owing to the positive pressure condition of the intake passage 202x, essentially no blow-by gas is returned to the intake passage 202x. However, when the internal combustion engine E is operated in a high rpm condition for a prolonged period of time, the internal pressure of the internal combustion engine may rise to such an extent that a small amount of blow-by gas may flow through the fresh air chamber R3 to be introduced into a part of the intake passage 202x upstream of the compressor 202b. However, by this time, the blow-by gas is thoroughly freed from the oil in the spiral passage 262, and is introduced into the intake passage 202x via a fresh air passage 202y.

<Gas Liquid Separation Passage>

Figure 10:
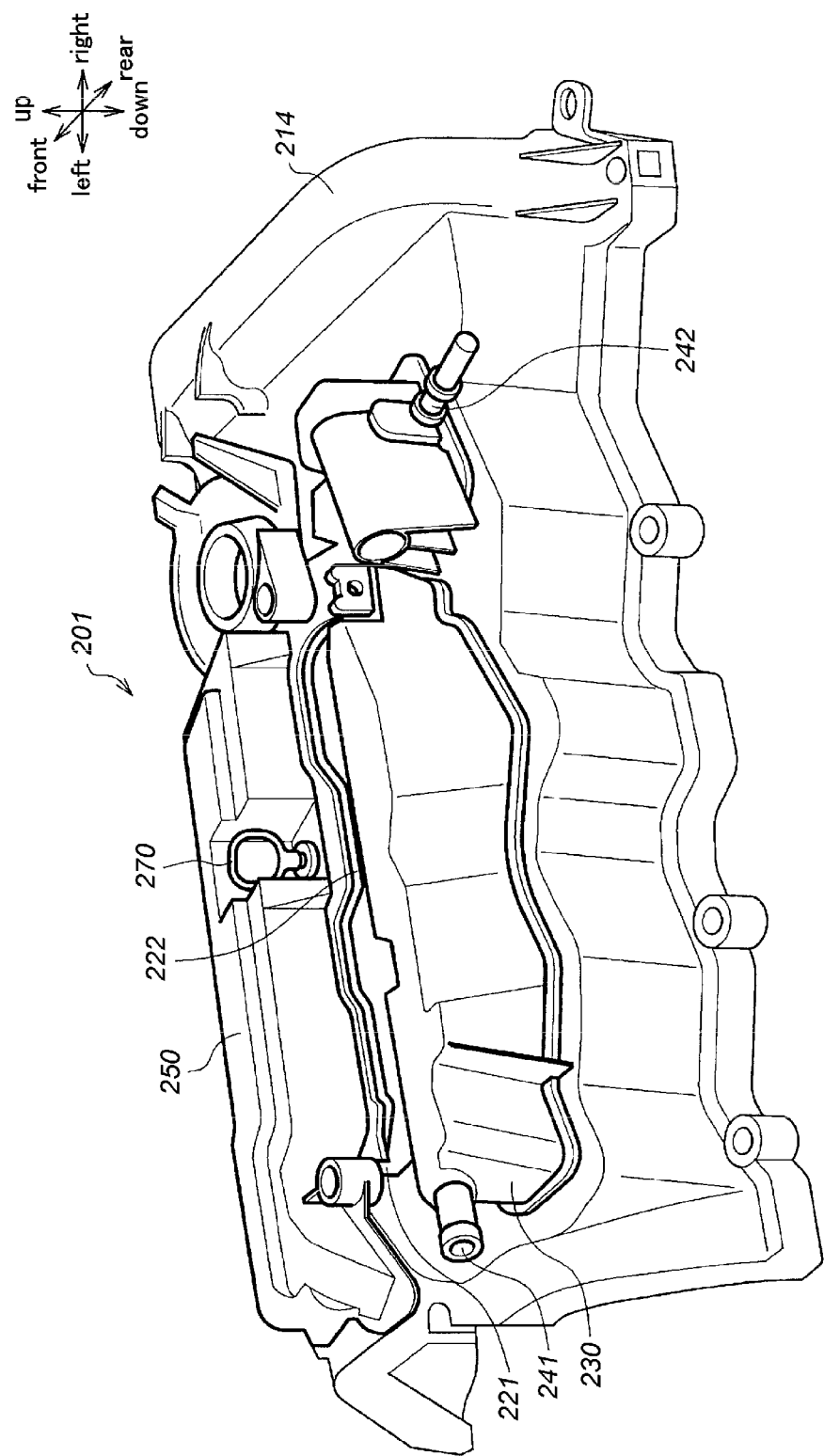
FIG. 10 is a perspective view of a head cover incorporated with a breather chamber and a fresh air chamber.
Figure 11:
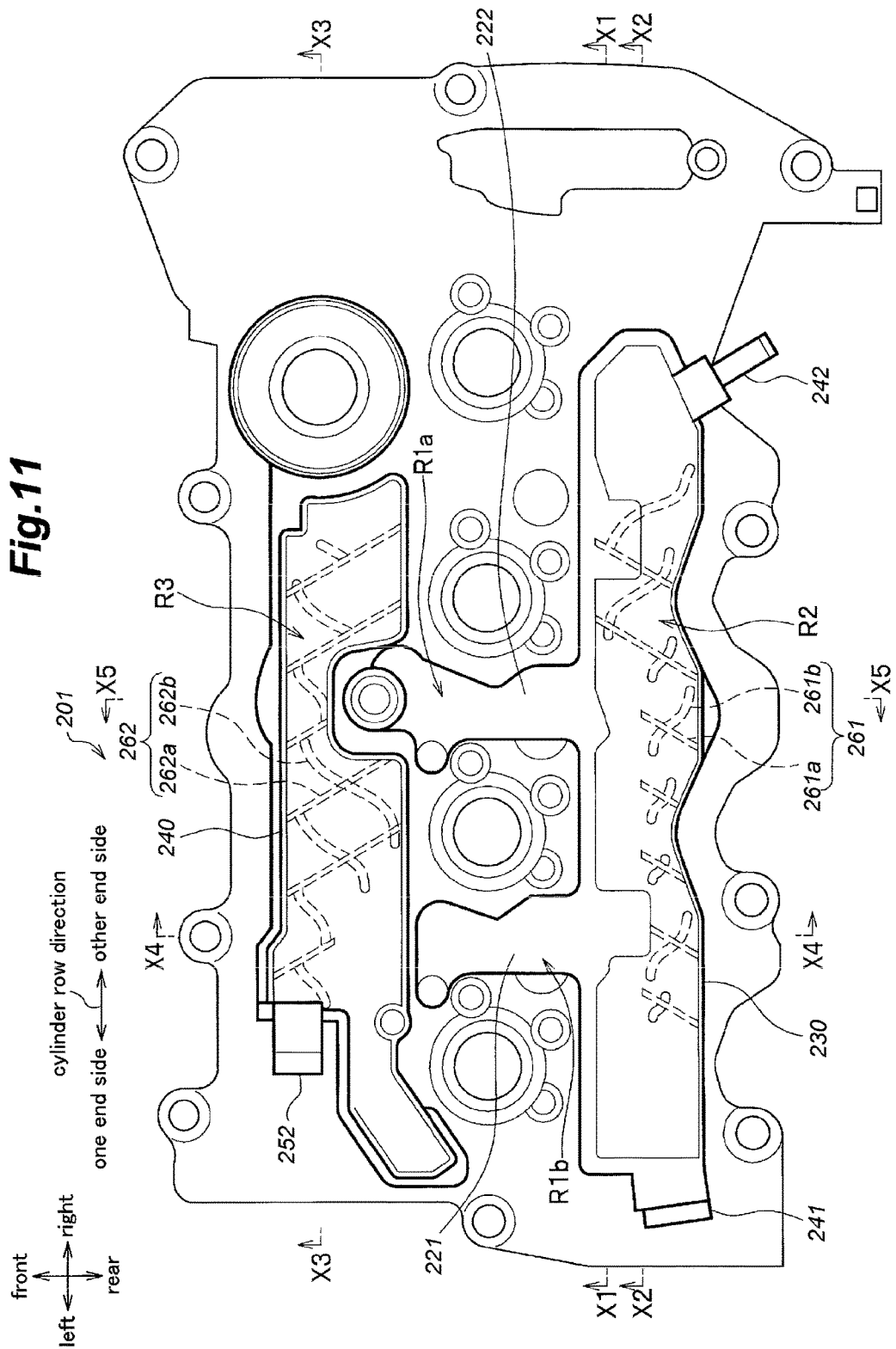
FIG. 11 is a plan view of the head cover incorporated with the breather chamber and the fresh air chamber.

In the second embodiment, as shown in FIGS. 10 and 11, the breather system 201 is integrally formed in an upper part of the head cover 214 which is provided with a breather chamber upper 230, a PCV valve 241, a one way valve 242 and a fresh air chamber upper 250. The head cover 214, the breather chamber upper 230 and the fresh air chamber upper 250 form the guide passages R1a and R1b, the breather chamber R2 and the fresh air chamber R3 as shown in FIG. 12. In the second embodiment, the breather chamber R2 extends laterally in a rear end part of the head cover 214 of the internal combustion engine E, and the fresh air chamber R3 extends laterally in a front end part of the head cover 214 of the internal combustion engine E.

<Guide Passage>

As shown in FIG. 12, the guide passage R1a is a blow-by gas passage communicating the breather passage R0a and the first gas liquid separation chamber R2a with each other. When the internal combustion engine E is mounted on a vehicle, the upstream side of the guide passage R1a extends in the fore and aft direction. The guide passage R1a is formed by welding a guide passage upper 221a integrally formed with the fresh air chamber R3 to a guide passage lower 221b integrally formed with the breather chamber upper 230.

The guide passage R1b is a blow-by gas passage communicating the breather passage R0b and the first gas liquid separation chamber R2a with each other. When the internal combustion engine E is mounted on a vehicle, the upstream side of the guide passage R1b extends laterally and the downstream part of the guide passage R1b extends in the fore and aft direction. The guide passage R1b is formed by welding a guide passage lower 214a2 to a guide passage upper 222 integrally formed with the breather chamber upper 230.

As shown in FIG. 9, the breather passages R0a and R0b are provided in parts of the oil pan 215 having mutually different depths. In the second embodiment, the breather passage R0a is provided in a relatively deep part of the oil pan 215, and the breather passage R0b is provided in a relatively shallow part of the oil pan 215.

<Breather Chamber>

As shown in FIG. 12, the breather chamber R2 has the function to separate oil from the blow-by gas introduced from the guide passages R1a and R1b when the intake passage 202x is under a negative pressure condition, and return the blow-by gas freed from the oil to the combustion chambers via the intake manifold 202d while the separated oil is retuned to the interior of the internal combustion engine E. The breather chamber R2 is formed by welding the breather chamber upper 230 to a breather chamber lower 214b.

The breather chamber lower 214b forms the lower part of the breather chamber R2 or the bottom wall, the front and rear side walls, and the left and right side walls of the breather chamber R2, and is integrally formed with the upper wall of the head cover 214.

The breather chamber upper 230 forms an upper part of the breather chamber R2, and includes an upper main body 231, a partition wall portion 232, valve mounting portions 233 and 234 and a rib 235.

The upper main body 231 forms the upper wall and an upper part of the front and rear side walls and the left and right side walls. The partition wall portion 232 separates the interior of the breather chamber R2 into the first gas liquid separation chamber R2a, the second gas liquid separation chamber R2b and the communication passage R2c.

The valve mounting portion 233 is formed in a part of the upper main body 231 on the one end side with respect to the cylinder row direction, and consists of a hole for receiving a PCV valve 241. The valve mounting portion 234 is formed in a part of the upper main body 231 on the other side with respect to the cylinder row direction, and consists of a hole for receiving a one way valve 242.

The rib 235 extends upright from the partition wall portion 232, and opposes a blow-by gas outlet 241a of the PCV valve 241 mounted on the valve mounting portion 233.

The breather chamber R2 includes the first gas liquid separation chamber R2a, the second gas liquid separation chamber R2b and the communication passage R2c.

<First Gas Liquid Separation Chamber>

The first gas liquid separation chamber R2a is a blow-by gas passage extending linearly along the cylinder row direction in plan view. The bottom surface of the first gas liquid separation chamber R2a inclines downward from the one end side of the cylinder row direction to the other end side of the cylinder row direction. A first oil return hole 214e is formed in a part of the bottom wall of the first gas liquid separation chamber R2a located on the other end side of the cylinder row direction. The first oil return hole 214e communicates with the valve actuation chamber in the cylinder head 213.

<Second Gas Liquid Separation Chamber>

The second gas liquid separation chamber R2b is a blow-by gas passage extending linearly along the cylinder row direction in plan view. The second gas liquid separation chamber R2b extends along and behind the first gas liquid separation chamber R2a in a state where the internal combustion engine is mounted on a vehicle. The bottom surface of the second gas liquid separation chamber R2b inclines downward from the other end side of the cylinder row direction to the one end side of the cylinder row direction. See FIG. 13a.

As shown in FIG. 13b, the second gas liquid separation chamber R2b is provided with a spiral passage 261 which is defined by a plurality of upper ribs 261a and a plurality of lower ribs 261b to cause a swirl motion to the blow-by gas flowing through the second gas liquid separation chamber R2b. As shown by broken lines in FIG. 11, these ribs 261a and 261b oppose one another so that each upper rib 261a oppose the corresponding lower rib 261b at the respective middle points so as to present the shape of letter X in plan view.

The upper ribs 261a extend downward from the inner surface of the breather chamber upper 230 of the breather chamber R2, and the lower ribs 261b extend upward from the inner surface of the breather chamber lower 214b of the breather chamber R2. The upper and lower ribs 261a and 261b are tilted so as to cross one another at the respective middle points, thereby presenting the shape of letter X in plan view. Owing to these ribs 261a and 261b, the blow-by gas flowing through the breather chamber R2 is converted into a swirling vortex flow.

<Communication Passage>

The communication passage R2c is a blow-by gas passage extending in the shape of letter U between a part of the first gas liquid separation chamber R2a on the one end side of the cylinder row direction and a part of the second gas liquid separation chamber R2b on the one end side of the cylinder row direction. The bottom surface of the part of the communication passage R2c adjoining the second gas liquid separation chamber R2b is more downwardly recessed than the bottom surface of the other end part of the communication passage R2c and the bottom surface of the second gas liquid separation chamber R2b, and a second oil return hole 214f (See FIG. 13b) is formed in this recess.

<PCV Valve>

As shown in FIG. 12, the PCV (positive crankcase ventilation) valve 241 is provided in the part of the communication passage R2c adjoining the second gas liquid separation chamber R2b, and extends in the lengthwise direction of the second gas liquid separation chamber R2b. The PCV valve 241 regulates the flow rate of the blow-by gas that flows through the communication passage R2c, and is configured to open when the negative pressure in the intake passage 202x drops below a prescribed level, and open by a degree corresponding to the level of the negative pressure. When the negative pressure is lost, the PCV valve closes. The PCV valve 241 has the function to improve the oil separation performance by the fact that the elastic member urging the valve member as well as the valve member vibrates owing to the collision with the blow-by gas, and the resulting increase in the turbulence of the blow-by gas causes the blow-by gas to more actively collide with the valve member, the elastic member and the communication passage wall in the PCV valve 241. The blow-by gas that has been introduced into the PCV valve 241 from the communication passage R2c is expelled from a blow-by gas outlet 241a of the PCV valve 241 to the second gas liquid separation chamber R2b.

<One Way Valve>

The one way valve 242 is provided in a part of the second gas liquid separation chamber R2b on the other end side of the cylinder row direction, and the downstream side of the one way valve 242 is communicated with the intake manifold 202d. The one way valve 242 opens when the intake passage 202x is under a negative pressure condition to permit the ejection of blow-by gas from the second gas liquid separation chamber R2b to the intake manifold 202d, and closes when the intake passage 202x is under a positive pressure condition to prevent the reverse flow of fresh air from the intake passage 202x.

<Fresh Air Chamber>

The fresh air chamber R3 has the function to introduce a part of the fresh air introduced into the intake passage 202x into the interior of the internal combustion engine E for a scavenging action by making use of the fact that the pressure of the interior of the internal combustion engine E drops when the intake passage 202x is under a negative pressure condition, and the blow-by gas is drawn into the interior of the internal combustion engine E. When the intake passage 202x is under a positive pressure condition, the blow-by gas in the interior of the internal combustion engine E is returned to the intake manifold 202d while the oil contained in the blow-by gas is removed. The end of the fresh air chamber R3 on the one end side of the cylinder row direction is in communication with the part of the intake passage 202x upstream of the compressor 202b via the fresh air passage 202y for conducting the fresh air and the blow-by gas. The end of the fresh air chamber R3 on the other end side of the cylinder row direction is in communication with the interior of the internal combustion engine E via the intake manifold 202d for conducting the fresh air and the blow-by gas.

The fresh air chamber R3 is formed by welding or otherwise bonding the fresh air chamber upper 250 to the fresh air chamber lower 214c.

The fresh air chamber lower 214c is integrally formed on the upper end of the head cover 214, and forms the lower part of the fresh air chamber R3 or the bottom wall, and the lower part of the front and rear side walls, and the right and left side walls of the fresh air chamber R3.

The fresh air chamber upper 250 forms the upper part of the fresh air chamber R3, and includes an upper main body 251, a pipe mounting portion 252 and a partition wall 253.

The upper main body 251 forms the upper wall, and the upper part of the front and rear side walls, and the right and left side walls of the fresh air chamber R3. The pipe mounting portion 252 consists of a hole formed in the rear wall of the upper main body 251, and is connected to a pipe defining the fresh air passage 202y communicating the fresh air chamber R3 with the upstream end of the compressor 202b for conducting blow-by gas. The partition wall 253 separates the fresh air chamber upper 250 from the guide passage upper 221a integrally formed with the fresh air chamber upper 250.

<Spiral Passage>

As shown in FIG. 14a, the fresh air chamber R3 is provided with the spiral passage 262 which includes a plurality of upper ribs 262a and a plurality of lower ribs 262b for causing a swirl or vortex flow to the blow-gas flowing through the fresh air chamber R3.

The upper ribs 262a extend downward from the inner surface of the breather chamber upper 230 of the fresh air chamber R3, and the lower ribs 262b extend upward from the inner surface of the fresh air chamber lower 214c of the fresh air chamber R3. The upper and lower ribs 262a and 262b are tilted so as to cross one another at the respective middle points, thereby presenting the shape of letter X in plan view. Owing to these ribs 262a and 262b, the blow-by gas flowing through the fresh air chamber R3 is converted into a swirling vortex flow.

<Mode of Operation>

The mode of operation of the breather system 201 of the internal combustion engine E is described in the following regarding the case of a negative pressure condition in the intake passage and a positive pressure condition in the intake passage, in that order.

<Gas Liquid Separation in the Intake Passage Under Negative Pressure Condition>

In FIG. 12, the solid arrows indicate the flows of the fresh air and the blow-by gas. In FIGS. 13a, 13b, 14b and 16, and the solid arrows indicate the flow of the blow-by gas, and the broken line arrows indicate the flow of the oil separated from the blow-by gas.

Figure 16:
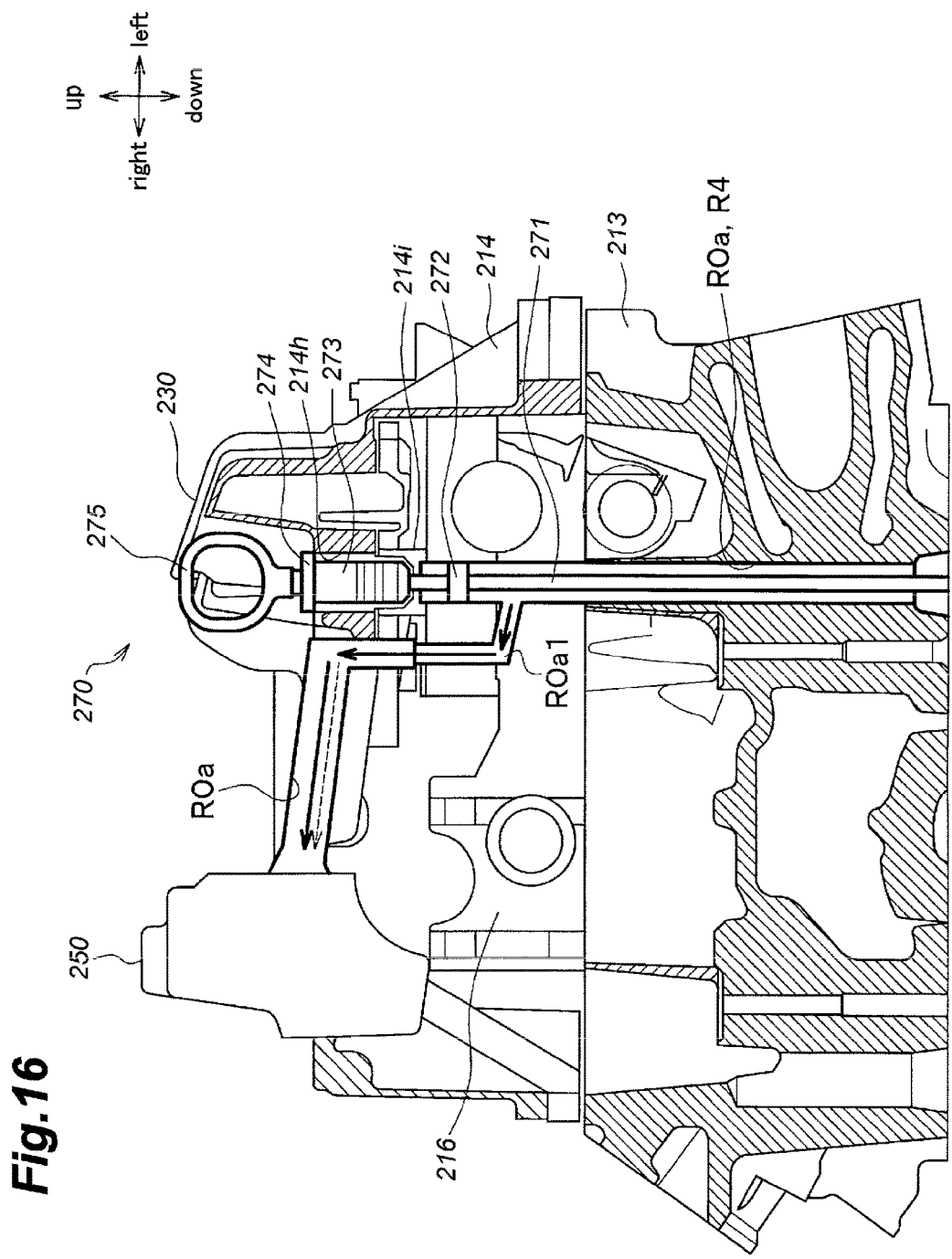
FIG. 16 is a view as seen in the direction of arrow X5 in FIG. 11, showing an oil level gauge insertion hole and an oil level gauge.

As shown in FIG. 12, the blow-by gas that has leaked from the combustion chambers to the crankcase chamber is introduced into the first gas liquid separation passage R2a of the breather chamber R2 via the breather passage R0a and the guide passage R1a (See FIG. 14b), and is also introduced into the first gas liquid separation chamber R2a of the breather chamber R2 via the breather passage R0b and the guide passage R1b (See FIG. 16). The oil separated from the blow-by gas flowing through the guide passage R1a is returned to the interior of the internal combustion engine E via the first oil return hole 214e.

The blow-by gas that has been introduced into the first gas liquid separation chamber R2a passes through the first gas liquid separation chamber R2a from the end thereof on the one end side of the cylinder row direction to the end thereof on the other end side of the cylinder row direction before being introduced into the communication passage R2c. The oil that has been separated from the blow-by gas that flows through the first gas liquid separation chamber R2a flows along the bottom surface of the first gas liquid separation chamber R2a from the one end side of the cylinder row direction to the other end side of the cylinder row direction, and is then returned to the interior of the internal combustion engine E via the second oil return hole 214f (See FIG. 13a).

The blow-by gas that has been introduced into the communication passage R2c flows therein toward the PCV valve 241 provided in the communication passage R2c.

Of the oil mist contained in the blow-by gas introduced into the PCV valve 241, the part in the form of relatively large particles is removed from the blow-by gas as the blow-by gas flows through the passage in the PCV valve 241. The oil separated from the blow-by gas as the blow-by gas flows through the PCV valve 241 is expelled downward from the blow-by gas outlet 241a of the PCV valve 241, and is then returned to the interior of the internal combustion engine E via the second oil return hole 214f (See FIG. 13b).

Of the oil mist contained in the blow-by gas introduced into the PCV valve 241, the part in the form of relatively small particles is converted into oil mist in the form of relatively large particles as the blow-by gas flows through the PCV valve 241 because the small particles adhere to one another as they pass through the narrow passage of the PCV valve 241, and the oil mist in the form of relatively large particles is introduced into the second gas liquid separation chamber R2b. The oil mist in the form of relatively large particles can be relatively easily separated into the gas and the oil. The blow-by gas introduced into the second gas liquid separation chamber R2b flows from the one end side of the cylinder row direction to the other end side of the cylinder row direction.

The blow-by gas that flows through the second gas liquid separation chamber R2b flows as a swirling vortex flow owing to the spiral passage 261 defined in the second gas liquid separation chamber R2b. The oil mist in the blow-by gas is converted into oil mist in the form of relatively large particles owing to the mutual adherence of the oil particles under the action of the centrifugal force, and is separated from the blow-by gas. The oil that has been separated from the blow-by gas flowing through the second gas liquid separation chamber R2b flows along the bottom surface of the second gas liquid separation chamber R2b from the other end side of the cylinder row direction to the one end side of the cylinder row direction, and is then returned to the interior of the internal combustion engine E via the second oil return hole 214f (See FIG. 13b).

<Positive Pressure Condition in the Intake Passage>

Figure 15:
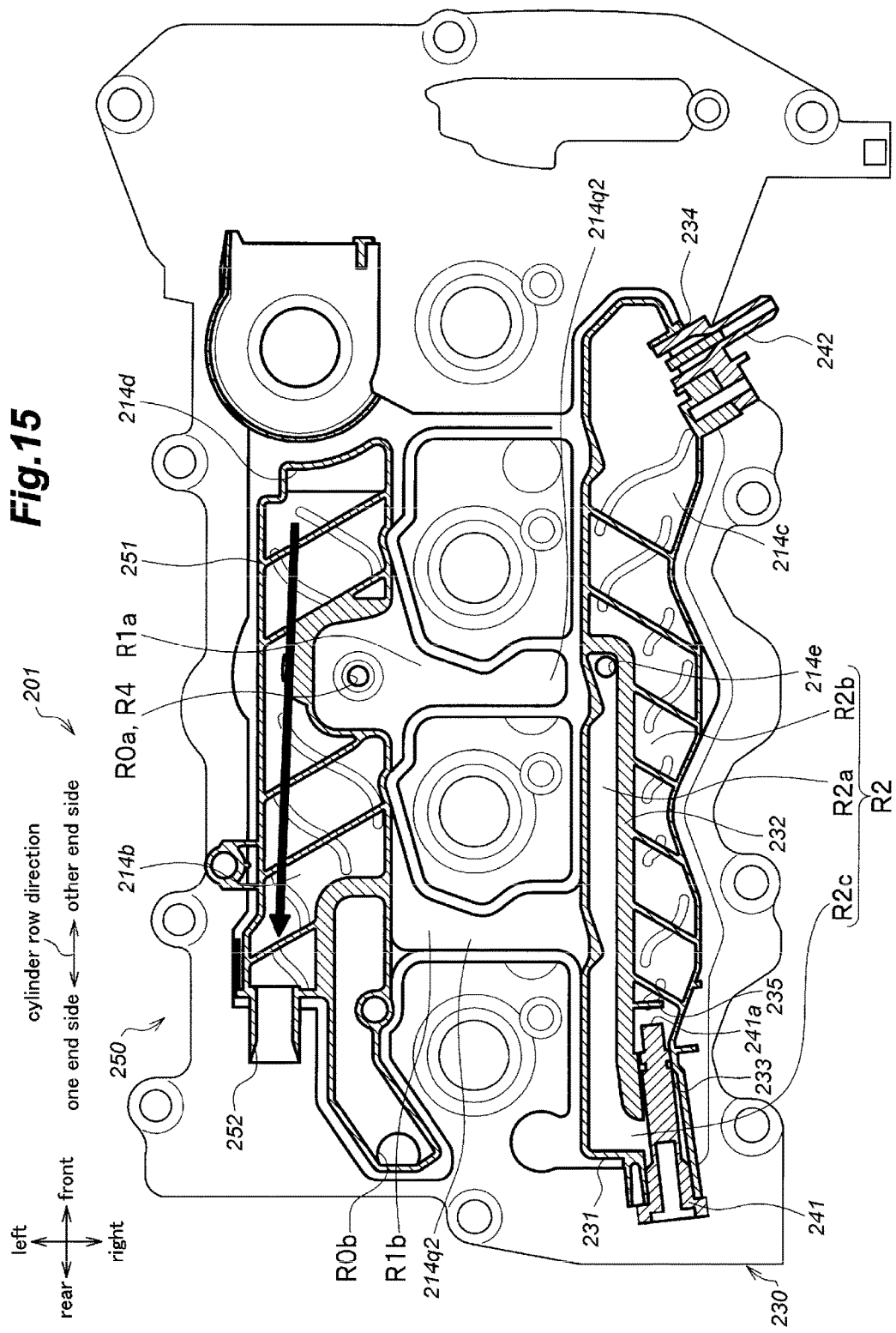
FIG. 15 is a sectional view of the head cover incorporated with the breather chamber and the fresh air chamber, showing the flow of blow-by gas under a positive pressure condition.

In FIG. 15, the solid arrows indicate the flows of the blow-by gas. In FIG. 14a, the solid arrows indicate the flow of the blow-by gas, and the broken line arrows indicate the flow of the oil separated from the blow-by gas.

When the intake passage 202x is under a positive pressure condition, the one way valve 242 remains open. In this case, gas liquid separation by the breather chamber R2 does not take place. When the rpm of the internal combustion engine is high, and the supercharger is in operation, the intake passage 202x is under a positive pressure condition. However, when the pressure in the internal combustion engine is raised by the supercharger, blow-by gas is introduced into the fresh air chamber R3, and after the oil is separated from the blow-by gas, the blow-by gas is returned to a part of the intake passage 202x upstream of the compressor 202b of the supercharger. In other words, as shown in FIG. 15, the blow-by gas in the internal combustion engine E is introduced into the fresh air chamber R3 via the oil return hole 214d. The blow-by gas introduced into the fresh air chamber R3 flows therein from the other end side of the cylinder row direction to the one end side of the cylinder row direction, and is returned to a part of the intake passage 202x upstream of the compressor 202b of the supercharger via the pipe mounting portion 252.

The blow-by gas that flows through the fresh air chamber R3 flows as a swirling vortex flow owing to the spiral passage 262 defined in the fresh air chamber R3. The oil mist in the blow-by gas is converted into oil mist in the form of relatively large particles owing to the mutual adherence of the oil particles under the action of the centrifugal force, and is separated from the blow-by gas. The oil that has been separated from the blow-by gas flowing through the fresh air chamber R3 flows along the bottom surface of the fresh air chamber R3 from the one end side of the cylinder row direction to the other end side of the cylinder row direction, and is then returned to the interior of the internal combustion engine E via the oil return hole 214d (See FIG. 14a).

<Oil Level Gauge Insertion Hole and Oil Level Gauge>

The oil level gauge insertion hole and oil level gauge in the breather system 201 of the internal combustion engine E are described in the following. As shown in FIG. 16, the breather passage R0a serves also as an oil level gauge insertion hole R4 for receiving the oil level gauge 270. The breather passage R0a branches out from the oil level gauge insertion hole R4 in a part thereof adjacent to the upper end of the oil level gauge insertion hole R4, and is connected to the guide passage R1a via a branch passage R0a1 for conducting the blow-by gas.

The head cover 214 is provided with an oil level gauge guide hole 214h formed in a part thereof opposing the upper end of the oil level gauge insertion hole R4.

The oil level gauge 270 includes a gauge part 271, a bulging part 272, a large diameter part 273, a flange part 274 and a handle part 275.

The gauge part 271 is inserted into the oil level gauge insertion hole R4, and indicates the level of oil in the oil pan 215 according to the way the oil is deposited on the free end (lower end) of the gauge part 271.

The bulging part 272 closes the oil level gauge insertion hole R4 at a part thereof higher than the branching point of the branch passage R0a1 when the oil level gauge 270 is fully inserted in the oil level gauge insertion hole R4. The flange part 274 is an annular flange for minimizing the gap between the oil level gauge insertion hole R4 and the bulging part 272.

The large diameter part 273 is provided on the base end side of the gauge part 271, and is configured to be received in the oil level gauge guide hole 214h when the oil level gauge 270 is fully inserted in the oil level gauge insertion hole R4, and is provided with a plurality of seal members on the outer periphery thereof for sealing the gap between the large diameter part 273 and the inner circumferential surface of the oil level gauge guide hole 214h.

The flange part 274 is provided in the end of the large diameter part 273 remote from the gauge part 271, and is configured to engage the peripheral part of the upper end of the oil level gauge guide hole 214*h* when the oil level gauge 270 is fully inserted in the oil level gauge insertion hole R4.

The handle part 275 is provided in the end of the flange part 274 remote from the large diameter part 273, and consists of a ring by which the user holds the oil level gauge 270.

Figure 17:
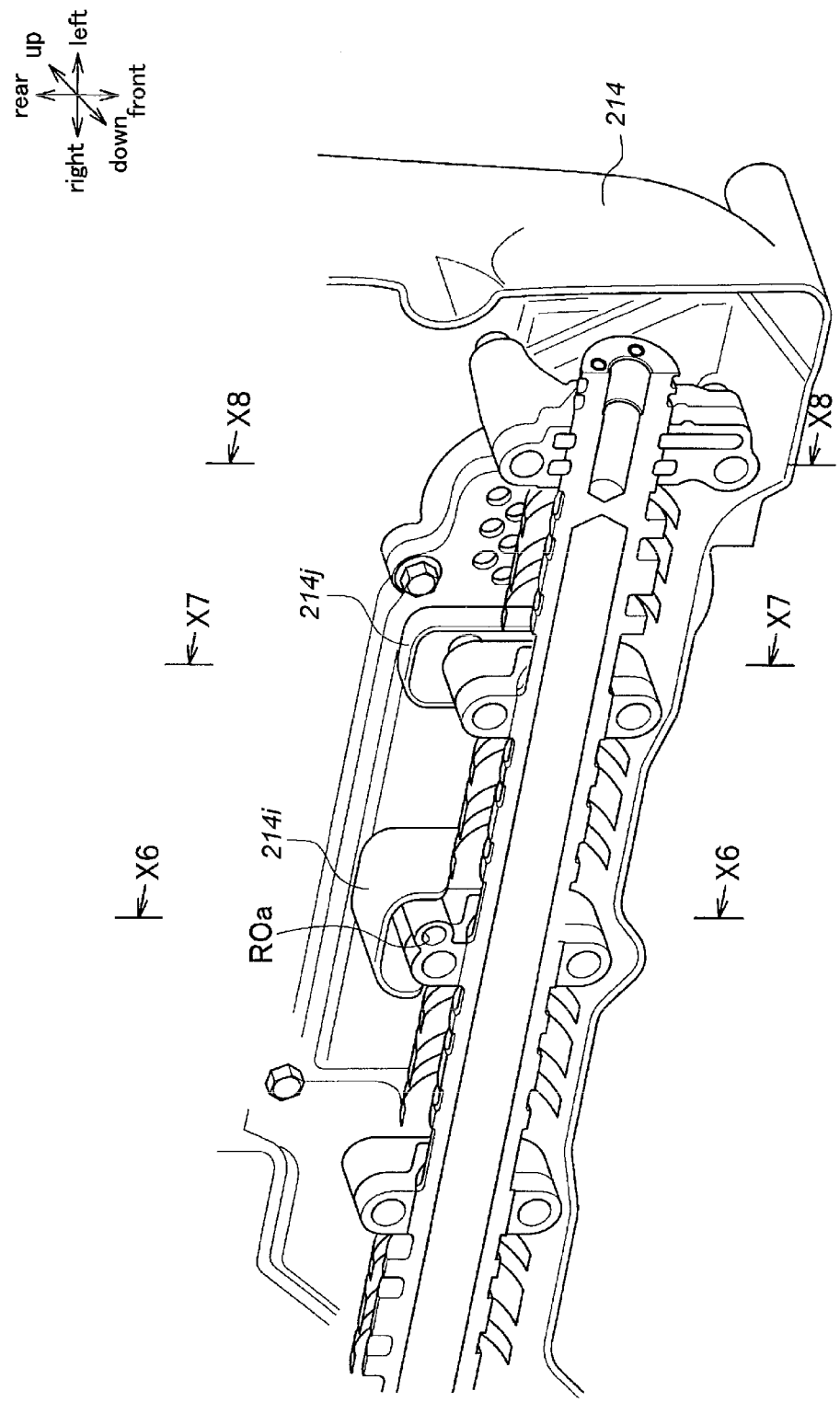
FIG. 17 is a perspective view of the head cover as seen from below.
Figure 18A:
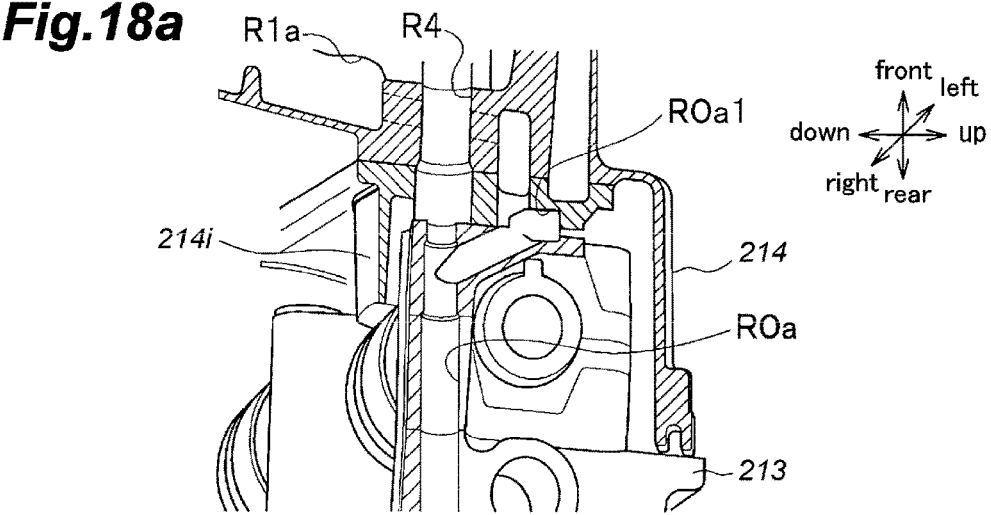
FIG. 18a is a view as seen in the direction of arrow X6 in FIG. 17.
Figure 18B:
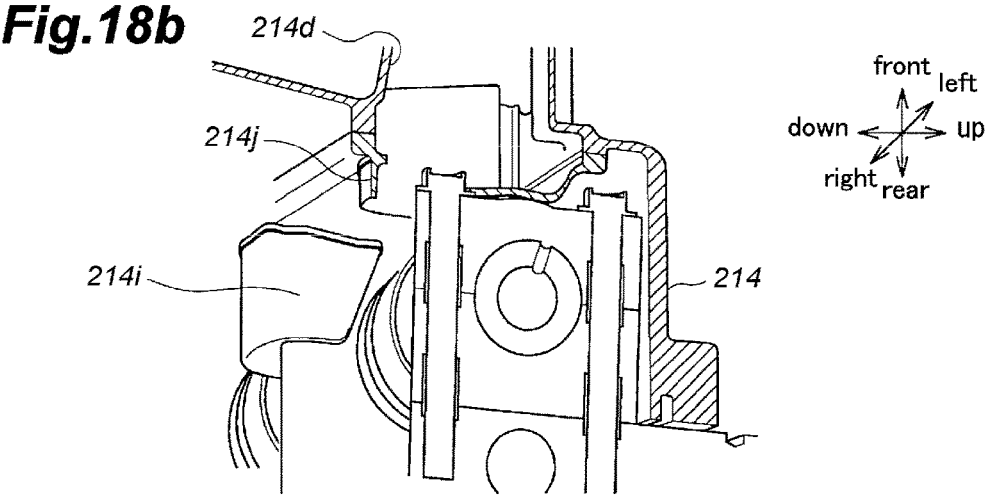
FIG. 18b is a view as seen in the direction of arrow X7 in FIG. 17.
Figure 18C:
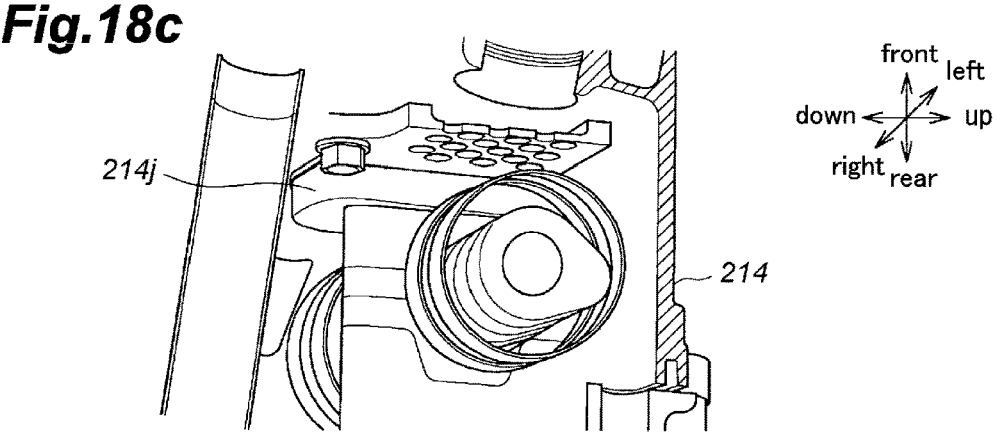
FIG. 18c is a view as seen in the direction of arrow X8 in FIG. 17.

As shown in FIGS. 17 and 18, the head cover 214 is provided with guard members 214*i* and 214*j*. The guard member 214*i* consists of a tubular member projecting downward from the bottom surface of the head cover 214 to separate the oil level gauge guide hole 214*h* from the oil level gauge insertion hole R4. The guard member 214*j* consists of a tubular member projecting downward from the bottom surface of the head cover 214 to cover a lower end of the oil return hole 214*d*.

The guide passage R1*a* on the side of the head cover 214 opens out in a part adjoining a cam lobe which is integrally formed with the camshaft and rotates in the second embodiment for compact design of the internal combustion engine E. The guard members 214*i* and 214 prevent the oil that is splashed within the cam actuation chamber by the cam lobe from being drawn into the guide passage R1*a* and the oil return hole 214*d* along with the blow-by gas.

In the second embodiment, the guide passage R1*a* on the side of the head cover 214 is provided with an enlarged cross sectional area in comparison to the oil level gauge insertion hole R4 in order to promote the flow of blow-by gas into the branch passage R0*a*1 branching out from the oil level gauge insertion hole R4. Therefore, the guard member 214*i* prevents the splashed oil from being mixed into the blow-by gas, and the blow-by gas can be favorably introduced into the breather chamber R2 so that the scavenging performance and the gas liquid separation performance can be further improved.

Because the bulging part 272 provided in the oil level gauge 270 is located immediately above the point of the oil level gauge insertion hole R4 from which the branch passage R0*a*1 branches out, the blow-by gas flowing down the oil level gauge insertion hole R4 is prevented from flowing toward the oil level gauge guide hole 214*h*, and is favorably diverted to the side of the branch passage R0*a*1. Even when the oil splashed in the valve actuation chamber reaches the area surrounding the oil level gauge guide hole 214*h*, the splashed oil is prevented from smearing the gauge part 271 when inserting and/or removing the oil level gauge 270 by causing the oil mist to be deposited on the bulging part 272. This is an additional function of the bulging part 272.

In the breather system 201 of the internal combustion engine of the second embodiment, the breather chamber R2 is essentially separated into two gas liquid separation chambers by the PCV valve 241 so that the part of the oil mist with relatively large particle sizes is removed when the blow-by gas flows through the PCV valve 241, and the part of the oil mist with relative small particle sizes is changed into that with relative large particle sizes owing to the mutual adherence of the particles as the oil mist passes through the narrow passage in the PCV valve 241 before being introduced into the second gas liquid separation chamber R2*b*. The oil mist with increased particle sizes can be readily separated from the blow-by gas in the second gas liquid separation chamber R2*b*. Also owing to the spiral passage 261 in the second gas liquid separation chamber R2*b*, the blow-by gas passes through the second gas liquid separation chamber R2*b* as a swirling vortex flow as the blow-by gas flows up and down in the second gas liquid separation chamber R2*b* so that the oil mist in the blow-by gas is converted into that with large particle sizes under the action of the centrifugal force, and the gas liquid separation performance can be improved.

In the breather system 201 of the internal combustion engine E, when the blow-by gas in the internal combustion engine E is supplied to the intake passage 202*x* by the intake negative pressure, the negative pressure in the interior of the internal combustion engine E admits the fresh air from the fresh air chamber R3 into the interior of the internal combustion engine E so that the interior of the internal combustion engine E can be favorably scavenged. Furthermore, when the intake passage 202*x* is placed under a positive pressure condition by the compressor 202*b* of the supercharger when the engine E is operating under a high load and a high rpm condition, and the supercharger is therefore in operation, the one way valve 242 of the breather chamber R2 closes so that the blow-by gas does not flow into the breather chamber R2, thereby causing a fear that the blow-by gas might flow into the fresh air chamber R3. However, because the fresh air chamber R3 is provided with a spiral passage, and is therefore capable of removing oil from the blow-by gas in a favorable manner, only the blow-by gas freed from oil is introduced into the intake passage 202*x*. Therefore, pollution of the intake passage 202 with the oil can be avoided, and the pressure in the interior of the internal combustion engine is prevented from rising excessively so that the scavenging performance for the interior of the internal combustion engine can be maintained in a favorable manner.

In the breather system 201 of the internal combustion engine E, because the ribs 261*a*, 261*b*, 262*a* and 262*b* in the spiral passages 261 and 262 cause the swirling movement of the blow-by gas as the blow-by gas flows up and down in the spiral passages 261 and 262, even when the length of the internal combustion engine along the cylinder row direction is small, and the passage diameter of the breather chamber R2 and the fresh air chamber R3 is small, an adequate gas liquid separation performance can be achieved owing to the use of the centrifugal force.

In the breather system 201 of the internal combustion engine E, when the intake passage 202*x* is placed under a positive pressure condition owing to the operation of the supercharger, and the one way valve 242 provided in the breather chamber R2 closes so that the flow of the blow-by gas has substantially ceased, the oil separated from the blow-by gas in the guide passage R1*a* and the first gas liquid separation chamber R2*a* can be quickly returned to the interior of the internal combustion engine E via the first oil return hole 214*e*, and the oil collected in the second gas liquid separation chamber R2*b* can be quickly returned to the interior of the internal combustion engine E via the second oil return hole 214*f*.

When the engine is operating at a low rpm or a medium rpm, and the supercharger is not in operation, the intake passage 202*x* is under a negative pressure condition. Because the velocity of the flow of the blow-by gas into the first gas liquid separation chamber R2*a* is relative low, even though the first oil return hole 214*e* is provided in a part of the first gas liquid separation chamber R2*a* adjoining the guide passage R1*a*, very little of the oil separated from the blow-by gas is stirred up by the blow-by gas in the part surrounding the first oil return hole 214*e*, and is thereby mixed back into the blow-by gas. Also, because the first oil return hole 214*e* is provided remote from the PCV valve 241, the oil in the PCV valve 241 is prevented from being deposited in a part adjoining the PCV valve 241 and obstructing the flow of the blow-by gas through the PCV valve 241.

In the breather system 201 of the internal combustion engine E, because the bottom surfaces of the first gas liquid separation chamber R2a and the second gas liquid separation chamber R2b are inclined downward toward the respective oil return holes 214e and 214f, the oil separated from the blow-by gas in the first gas liquid separation chamber R2a and the second gas liquid separation chamber R2b can be quickly returned to the interior of the internal combustion engine E via the oil return holes 214e and 214f.

In the breather system 201 of the internal combustion engine E, the PCV valve 241 having the additional function to serve as a communication passage between the first gas liquid separation chamber R2a and the second gas liquid separation chamber R2b extends along the lengthwise direction of the second gas liquid separation chamber R2b so that the width of the head cover 214 with respect to the direction perpendicular to the cylinder row direction can be minimized, and a compact design of the breather chamber R2 and a high gas liquid separation performance can be achieved at the same time. In the breather system 201 of the internal combustion engine E, the blow-by gas that has been expelled from the PCV valve 241 to the second gas liquid separation chamber R2b attains a high velocity as the blow-by gas passes through the narrow passage in the PCV valve 241 and flows out of the blow-by gas outlet 241a. The blow-by gas that leaves the PCV valve 241 via the blow-by gas outlet 241a at high velocity collides with a rib 235 provided opposite to the blow-by gas outlet 241a so that the oil mist adheres to the rib 235, and increases the particle sizes thereof, and the gas liquid separation performance can be improved even further.

In the breather system 201 of the internal combustion engine E, because the breather passages Roa and Rob are provided in the parts of the oil pan 215 having different depths, even when the internal combustion engine E is inclined owing to the cornering of the vehicle or the inclination of the road surface, and part of the breather passages are submerged in the oil, the blow-by gas can still be introduced into the breather chamber R2 via the remaining breather passages so that the pressure in the internal combustion engine E can be favorably adjusted, and an increase in friction owing to the increase in the blow-by gas pressure in the crankcase chamber can be avoided.

In the breather system 201 of the internal combustion engine E, because a same, single hole serves as both the breather passage R0a and the oil level gauge insertion hole R4, the manufacturing work is simplified, and the size of the internal combustion engine E can be reduced. In the breather system 201 of the internal combustion engine E, owing to the presence of the guard members 213i and 214j, the smearing of the upper end of the oil level gauge insertion hole R4 with the oil mist in the blow-by gas flowing through the breather passage R0a can be avoided, and the oil dripping from the oil return hole 214d is prevented from splashing onto the upper end of the oil level gauge insertion hole R4. In other words, when the oil level gauge 270 is inserted into the oil level gauge insertion hole R4 or is removed from the oil level gauge insertion hole R4, oil is prevented from being deposited on the gauge part 271 of the oil level gauge 270 in the upper end of the oil level gauge insertion hole R4 so that the oil level can be favorably measured without suffering from such interferences.

In the breather system 201 of the internal combustion engine E, even when oil should be deposited on the upper end of the oil level gauge insertion hole R4, the oil that could otherwise interfere with the measurement of the oil level is deposited on or wiped out by the bulging part 272, and is thereby prevented from being deposited on the gauge part 271 of the oil level gauge 270 so that the oil level can be favorably measured at all times.

OTHER EMBODIMENTS

The breather system of an internal combustion engine of another embodiment of the present invention is described in the following in regard to the breather system 201 discussed above. FIG. 19 is a plan view of the breather system of another embodiment of the present invention. FIG. 20 is a view from the direction indicated by arrow X9 in FIG. 19. In the following description, the one end side and the other end of side of the cylinder row direction are reversed from those of the preceding embodiment.

In the breather system 201B of the internal combustion engine E of the embodiment illustrated in FIG. 19, the breather chamber R2 is provided with a relatively large volume, and the PCV valve 241 extends perpendicularly to the direction of the blow-by gas flow in the gas liquid separation chambers R2a and R2b, instead of extending along the length of the gas liquid separation chambers R2a and R2b. In the breather system 201B, the first gas liquid separation chambers R2a is also provided with a spiral passage 263 similar to the spiral passages 261 and 262. In this embodiment, the first gas liquid separation chambers R2a is located behind the second gas liquid separation chambers R2b.

As shown in FIG. 20, when the internal combustion engine E is laterally mounted on a vehicle, the bottom surfaces of the chambers R2 and R3 may be inclined with respect to the direction perpendicular to the cylinder row direction so that the oil separated from the blow-by gas in the first gas liquid separation chambers R2a is caused to flow downward through the PCV valve 241 toward the side of the second gas liquid separation chamber R2b. Thereby, the oil separated in the first gas liquid separation chambers R2a is prevented from being stored therein, and can be quickly returned to the side of the oil pan 215 (See FIG. 1).

In the breather system 201B illustrated in FIG. 19, no special guide passage for guiding the blow-by gas from the breather passage to the breather chamber R2 is provided, and a same hole serves both as the oil return hole 214e for returning oil from the first gas liquid separation chambers R2a and the blow-by gas introduction hole (breather passage) for introducing blow-by gas into the first gas liquid separation chambers R2a. In other words, the oil return hole 214e serves both as the oil return hole and the blow-by gas inlet hole.

The breather passages and the oil return hole 214e are typically formed in parts of the internal combustion engine which are not used for other purposes, and are often provided in a plurality of locations. Therefore, it has been a common practice to use a same hole or passage as an oil return passage and a breather passage.

In an internal combustion engine E equipped with a supercharger, as is the case with the present invention, the rotational speed is high, and the amount of blow-by gas is great. Therefore, when the oil return passage and the breather passage share a same passage, if the oil to be returned is large in quantity, the oil return hole 214e could be blocked, and the blow-by gas may not flow freely into the breather chamber R2. Therefore, in the breather system 201B illustrated in FIG. 19, an auxiliary opening 214g is formed in a position higher than the oil return hole 214e along the inclined direction and different from the upstream side of the oil return hole 214e of the oil return hole 214e with respect to the flow of the oil separated from the blow-by gas along the bottom surface of the first gas liquid separation chambers R2a.

Thereby, the auxiliary opening 214g is located substantially above the upper end of the breather passage in the internal combustion engine E so that the blow-by gas can be favorably introduced into the breather chamber R2 via the auxiliary opening 214g which is located adjacent to the oil return hole 214e which could be blocked by the returning oil.

The embodiments of the present invention have been described above, but the present invention is not limited by such embodiments, and can be modified and substituted without departing from the spirit of the present invention. In the first embodiment, the first and second gas liquid separation passages 56 and 57 were both arranged along the cylinder row direction (lateral direction), but may also extend in any other horizontal direction such as in the fore and aft direction. The position of the PCV valve 70 can be changed, and may be provided between the second gas liquid separation passage 57 and the intake system 21. The internal combustion engine E may also be mounted on a vehicle in other orientations, beside from that shown in the drawings. The second oil return hole 214f may be provided in a part of the bottom wall of the second gas liquid separation chamber R2b on the one end side of the cylinder row direction.

GLOSSARY OF TERMS 1 internal combustion engine
4 head cover
10 oil separation device
11 crankcase chamber
21 intake system
24A compressor
25 throttle valve
26 intake manifold
33 oil chamber
35 oil return passage
36 first blow-by gas passage
37 gauge passage
41 first cover member
42 second cover member
44 valve actuation chamber
48 gauge hole
51 oil level gauge
53 first gas inlet hole
54 vent hole (gas inlet)
56 first gas liquid separation passage
56A lower wall
56B upper wall
56C front side wall
56D rear side wall
56G narrowed section
56H lower partition wall
56J upper partition wall
57 second gas liquid separation passage
57A lower wall
57B upper wall
57C front side wall
57D rear side wall
57G narrowed section
57H lower partition wall
57J upper partition wall
58 second blow-by gas passage
59 third blow-by gas passage
63 gas communication port (gas outlet)
64 gas passage
65 gas outlet port
66 blow-by gas supply passage
67 second gas inlet port
70 PCV valve (gas inlet)
76 oil discharge hole
201 breather system of internal combustion engine (oil separation device)
202b compressor
214 cylinder head
215 oil pan
235 rib
241 PCV valve
242 one way valve
261, 262, 263 spiral passage
261a, 262a upper rib (upper partition wall)
261b, 262b lower rib (lower partition wall)
270 oil level gauge
272 bulging portion
E internal combustion engine
R0a breather passage
R0a1 branch passage
R0b breather passage
R1a guide passage
R1b guide passage
R2 breather chamber
R2a first gas liquid separation passage
R2b second gas liquid separation passage
R2c communication passage
R3 fresh air chamber
R4 oil level gauge insertion hole

The invention claimed is:

1. A breather system of an internal combustion engine provided with a PCV circuit for returning blow-by gas produced in the internal combustion engine fitted with a supercharger to an intake passage by using an intake negative pressure produced in the intake passage to be used for combustion once again, the breather system comprising, a breather chamber provided on top of a head cover of the internal combustion engine and communicating with a breather passage for conducting blow-by gas produced in the internal combustion engine, the breather chamber including a first gas liquid separation chamber extending in a cylinder row direction and communicating with the breather passage, a second gas liquid separation chamber extending in the cylinder row direction along the first gas liquid separation chamber and communicating with an interior of the internal combustion engine via the intake passage, and a communication passage communicating the first gas liquid separation chamber with the second gas liquid separation chamber at one end of the internal combustion engine with respect to the cylinder row direction, the second gas liquid separation chamber including a spiral passage for causing a swirling flow of the blow-by gas in the second gas liquid separation chamber;

a fresh air chamber extending in the cylinder row direction along the breather chamber in an upper part of the head cover of the internal combustion engine for introducing fresh air into an interior of the internal combustion engine and scavenging an interior of the internal combustion engine by using an intake negative pressure in the internal combustion engine, the fresh air chamber communicating with an interior of the internal combustion engine at one end thereof with respect to the cylinder row direction and with a part of the intake passage on an upstream side of the supercharger at another end thereof with respect to the cylinder row direction, and being provided with a spiral passage for causing a swirl flow of the fresh air and the blow-by gas conducted in the fresh air chamber;

a PCV valve provided in the communication passage for adjusting a flow rate of the blow-by gas; and a one-way valve provided at another end of the internal combustion engine with respect to the cylinder row direction for expelling the blow-by gas from the second gas liquid separation chamber, wherein the spiral passage comprises a lower rib extending upward from a bottom surface of the corresponding chamber provided with the spiral passage and an upper rib extending downward from a ceiling surface of the corresponding chamber, the lower rib and the upper rib crossing each other so as to present a letter X shape in plan view.

2. The breather system of an internal combustion engine according to claim 1, wherein the PCV valve is provided along a length of the second gas liquid separation chamber in a part of the communication passage adjacent to a side wall of the second gas liquid separation chamber, and the second gas liquid separation chamber is provided with a rib opposing a blow-by gas outlet of the PCV valve and spaced from the blow-by gas outlet by a prescribed gap.

3. The breather system of an internal combustion engine according to claim 1, further comprising a guide passage provided in the head cover of the internal combustion engine for communicating a breather passage for conducting blow-by gas produced in the internal combustion engine with the first gas liquid separation chamber;

wherein the breather passage includes a plurality of breather passages having lower ends positioned in an oil pan of the engine at mutually different heights.

4. A breather system of an internal combustion engine provided with a PCV circuit for returning blow-by gas produced in the internal combustion engine fitted with a supercharger to an intake passage by using an intake negative pressure produced in the intake passage to be used for combustion once again, the breather system comprising, a breather chamber provided on top of a head cover of the internal combustion engine and communicating with a breather passage for conducting blow-by gas produced in the internal combustion engine, the breather chamber including a first gas liquid separation chamber extending in a cylinder row direction and communicating with the breather passage, a second gas liquid separation chamber extending in the cylinder row direction along the first gas liquid separation chamber and communicating with an interior of the internal combustion engine via the intake passage, and a communication passage communicating the first gas liquid separation chamber with the second gas liquid separation chamber at one end of the internal combustion engine with respect to the cylinder row direction, the second gas liquid separation chamber including a spiral passage for causing a swirling flow of the blow-by gas in the second gas liquid separation chamber;

a PCV valve provided in the communication passage for adjusting a flow rate of the blow-by gas; and a one-way valve provided at another end of the internal combustion engine with respect to the cylinder row direction for expelling the blow-by gas from the second gas liquid separation chamber;

wherein the spiral passage comprises a lower rib extending upward from a bottom surface of the corresponding chamber provided with the spiral passage and an upper rib extending downward from a ceiling surface of the corresponding chamber, the lower rib and the upper rib crossing each other so as to present a letter X shape in plan view.

5. A breather system of an internal combustion engine provided with a PCV circuit for returning blow-by gas produced in the internal combustion engine fitted with a supercharger to an intake passage by using an intake negative pressure produced in the intake passage to be used for combustion once again, the breather system comprising, a breather chamber provided on top of a head cover of the internal combustion engine and communicating with a breather passage for conducting blow-by gas produced in the internal combustion engine, the breather chamber including a first gas liquid separation chamber extending in a cylinder row direction and communicating with the breather passage, a second gas liquid separation chamber extending in the cylinder row direction along the first gas liquid separation chamber and communicating with an interior of the internal combustion engine via the intake passage, and a communication passage communicating the first gas liquid separation chamber with the second gas liquid separation chamber at one end of the internal combustion engine with respect to the cylinder row direction;

a PCV valve provided in the communication passage for adjusting a flow rate of the blow-by gas; and a one-way valve provided at another end of the internal combustion engine with respect to the cylinder row direction for expelling the blow-by gas from the second gas liquid separation chamber;

wherein the second gas liquid separation chamber includes a spiral passage for causing a swirling flow of the blow-by gas in the second gas liquid separation chamber, and the first gas liquid separation chamber comprises a hole portion serving as an oil return hole and a blow-by gas inlet hole formed in a bottom wall of an end of the first gas liquid separation chamber on the other end side of the cylinder row direction, and an auxiliary opening for introducing the blow-by gas into the first gas liquid separation chamber, the auxiliary opening being provided in a part of the first gas liquid separation chamber located higher than the hole portion serving as an oil return hole and a blow-by gas inlet hole in a state where the internal combustion engine is mounted on a vehicle and different from an upstream side of a downward flow of oil separated from the blow-by gas.

6. A breather system of an internal combustion engine provided with a PCV circuit for returning blow-by gas produced in the internal combustion engine fitted with a supercharger to an intake passage by using an intake negative pressure produced in the intake passage to be used for combustion once again, the breather system comprising, a breather chamber provided on top of a head cover of the internal combustion engine and communicating with a breather passage for conducting blow-by gas produced in the internal combustion engine, the breather chamber including a first gas liquid separation chamber extending in a cylinder row direction and communicating with the breather passage, a second gas liquid separation chamber extending in the cylinder row direction along the first gas liquid separation chamber and communicating with an interior of the internal combustion engine via the intake passage, and a communication passage communicating the first gas liquid separation chamber with the second gas liquid separation chamber at one end of the internal combustion engine with respect to the cylinder row direction, the second gas liquid separation chamber including a spiral passage for causing a swirling flow of the blow-by gas in the second gas liquid separation chamber;

a PCV valve provided in the communication passage for adjusting a flow rate of the blow-by gas;

a one-way valve provided at another end of the internal combustion engine with respect to the cylinder row direction for expelling the blow-by gas from the second gas liquid separation chamber;

a guide passage provided in the head cover of the internal combustion engine for communicating the breather chamber with a breather passage for conducting blow-by gas produced in the internal combustion engine, the guide passage communicating with the first gas liquid separation chamber at an end part of the first gas liquid separation chamber on the other end side of the cylinder row direction;

a first oil return portion formed in a part of a bottom wall of the first gas liquid separation chamber on the other end side of the cylinder row direction; and a second oil return portion formed in a part of a bottom wall of the second gas liquid separation chamber on the one end side of the cylinder row direction or in a part of a bottom wall of the communication passage adjacent to the second gas liquid separation chamber, wherein a bottom surface of the first gas liquid separation chamber is inclined downward from one end side of the cylinder row direction to another end side of the cylinder row direction in a state where the internal combustion engine is mounted on a vehicle; and wherein a bottom surface of the second gas liquid separation chamber is inclined downward from the other end side of the cylinder row direction to the one end side of the cylinder row direction in a state where the internal combustion engine is mounted on the vehicle.

7. A breather system of an internal combustion engine provided with a PCV circuit for returning blow-by gas produced in the internal combustion engine fitted with a supercharger to an intake passage by using an intake negative pressure produced in the intake passage to be used for combustion once again, the breather system comprising, a breather chamber provided on top of a head cover of the internal combustion engine and communicating with a breather passage for conducting blow-by gas produced in the internal combustion engine, the breather chamber including a first gas liquid separation chamber extending in a cylinder row direction and communicating with the breather passage, a second gas liquid separation chamber extending in the cylinder row direction along the first gas liquid separation chamber and communicating with an interior of the internal combustion engine via the intake passage, and a communication passage communicating the first gas liquid separation chamber with the second gas liquid separation chamber at one end of the internal combustion engine with respect to the cylinder row direction, the second gas liquid separation chamber including a spiral passage for causing a swirling flow of the blow-by gas in the second gas liquid separation chamber;

a PCV valve provided in the communication passage for adjusting a flow rate of the blow-by gas;

a one-way valve provided at another end of the internal combustion engine with respect to the cylinder row direction for expelling the blow-by gas from the second gas liquid separation chamber; and a guide passage provided in the head cover of the internal combustion engine for communicating a breather passage for conducting blow-by gas produced in the internal combustion engine with the first gas liquid separation chamber;

wherein the breather passage functions as an oil level gauge insertion hole, and the upper end of the breather passage communicates with the guide passage by branching off from the oil level gauge insertion hole, and the head cover includes an oil level gauge guide hole opposing a front end of the oil level gauge insertion hole and a guard member covering a part located between the oil level gauge guide hole and the oil level gauge insertion hole.

8. The breather system of an internal combustion engine according to claim 7, wherein the oil level gauge is provided with a bulging part for closing a part of the oil level gauge insertion hole located above a part thereof where the breather passage branches off.

* * * * *